(12) United States Patent
Lim et al.

(10) Patent No.: US 9,973,093 B1
(45) Date of Patent: May 15, 2018

(54) CONTROLLER DEVICE FOR RESONANT MODE POWER CONVERTER CIRCUIT

(71) Applicant: Infineon Technologies Austria AG, Villach (AT)

(72) Inventors: Cheow Guan Lim, Singapore (SG); Nitin Agarwal, Singapore (SG); Jian-Wei Liu, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days. days.

(21) Appl. No.: 15/340,690

(22) Filed: Nov. 1, 2016

(51) Int. Cl.
H02M 3/335 (2006.01)
H02M 1/42 (2007.01)

(52) U.S. Cl.
CPC ..... *H02M 3/33507* (2013.01); *H02M 1/4241* (2013.01)

(58) Field of Classification Search
CPC ...... H02M 3/156–3/158; H02M 3/335; H02M 3/33507; H02M 3/33523; H02M 3/33563; H02M 3/33569; H02M 3/33576; H02M 3/33592; H02M 2001/0032; H02M 2007/4815; Y02B 70/1475
USPC .......................................... 363/21.01–21.18
See application file for complete search history.

(56) References Cited

U.S. PATENT DOCUMENTS

| 8,749,209 | B2 | 6/2014 | Feldtkeller | |
| 2009/0016083 | A1* | 1/2009 | Soldano | H02M 3/33592 363/20 |
| 2012/0212145 | A1* | 8/2012 | Chan | H05B 33/0815 315/200 R |
| 2013/0229829 | A1* | 9/2013 | Zhang | H02M 3/33546 363/16 |
| 2015/0303813 | A1* | 10/2015 | Cheng | H02M 1/4258 363/21.02 |

OTHER PUBLICATIONS

Fei, "Microcontroller (MCU) Based Simplified Optimal Trajectory Control (SOTC) for High-Frequency LLC Resonant Converters," May 1, 2015, 107 pp. (uploaded in parts).
"Resonant LLC Converter: Operation and Design," Infineon; Application Note AN Sep. 2012; V.1.0; Sep. 2012; 19 pp.
Yang, "LLC Resonant Converter," Chapter 4, pp. 94-141, Topology Investigation for Front End DC/DC Power Conversion for Distributed Power System, (dissertation submitted to the Faculty of Virginia Polytechnic Institute and State University, Sep. 12, 2003.

(Continued)

*Primary Examiner* — Yemane Mehari
(74) *Attorney, Agent, or Firm* — Shumaker & Sieffert, P.A.

(57) ABSTRACT

In some examples, a controller device for a resonant mode power converter circuit comprises a feed-forward pin configured to receive an input voltage signal of the resonant mode power converter circuit, a feedback pin configured to receive an output voltage signal of the resonant mode power converter circuit, processing circuitry configured to determine a switching frequency based on the input voltage signal and the output voltage signal, a first control pin configured to deliver a first control signal to the first switch at the switching frequency, and a second control pin configured to deliver a second control signal the second switch at the switching frequency.

20 Claims, 15 Drawing Sheets

(56) References Cited

OTHER PUBLICATIONS

Ding, "Design of Resonant Half-Bridge converter using IRS2795(1,2) Control IC," Application Note AN-1160; www.irf.com: 32 pp.
"An introduction to LLC resonant half-bridge converter," AN2644; Application Note; Sep. 2008, 64 pp.
Mammano, "Resonant Mode Converter Topologies," Unitrode Corporation, 2001, 14 pp. (Applicant points out, in accordance with MPEP 609.04(a), that the year of publication, 2001, is sufficiently earlier than the effective U.S. filing date, Nov. 1, 2016, so that the particular month of publication is not in issue.).
Oruganti, "State-Plane Analysis of Resonant Converters," PhD Dissertation, Mar. 20, 1987, 533 pp. (uploaded in parts).
Feng, "State-Trajectory Analysis and Control of LLC Resonant Converters," PhD dissertation, Virginia Polytechnic Institute and State University, Mar. 29, 2013, 217 pp.
Fei, et al., "State-trajectory Control of LLC converter Implemented by Microcontroller," PMC review; Jun. 18, 2013, 8 pp.
Wang, et al., "Analysis and Implementation of LLC Burst Mode for Light Load Efficiency Improvement," In Proc. IEEE APEC, Feb. 2009, pp. 58-64.
Feng, et al., "A Universal Adaptive Driving Scheme for Synchronous Rectification in LLC Resonant Converters," IEEE Transactions on Power Electronics, vol. 27, No. 8, Aug. 2012, pp. 3775-3781.
Feng, et al., "Optimal Trajectory Control of LLC Resonant Converters for Soft Start-Up," IEEE Transactions on Power Electronics, vol. 29, No. 3, Mar. 2014, pp. 1461-1468.
Feng, et al., "Optimal Trajectory Control of Burst Mode for LLC Resonant Converter," IEEE Transactions on Power Electronics, vol. 28, No. 1, Jan. 2013, pp. 457-466.

\* cited by examiner

CONTROLLER DEVICE FOR RESONANT MODE POWER CONVERTER CIRCUIT

TECHNICAL FIELD

This disclosure relates to resonant mode power converter circuits, such as LLC converter circuits.

BACKGROUND

A resonant mode power converter circuit may include a half-bridge circuit with two switches. A controller device for the resonant mode power converter circuit may deliver control signals to the two switches at a switching frequency based on an output voltage of the resonant mode power converter circuit. If the controller device decreases the switching frequency of the control signals, the output voltage of the resonant mode power converter circuit may increase. However, if the controller device increases the switching frequency, the output voltage may decrease.

If the output load in a resonant mode power converter circuit changes, the output voltage may also change. Therefore, to keep the output voltage at a constant level, the controller device may sense the output voltage and adjust the switching frequency based on the sensed output voltage. If the controller device senses that the output voltage has increased, the controller device may increase the switching frequency to reduce the output voltage back to a desired level. On the other hand, if the controller device senses that the output voltage has decreased, the controller device may decrease the switching frequency to increase the output voltage back to the desired level.

SUMMARY

This disclosure describes techniques for determining a switching frequency of a resonant mode power converter circuit based on an input voltage signal and an output voltage signal. A controller device may include a feed-forward pin configured to receive an input voltage signal. The processing circuitry of the controller device may determine a new switching frequency based on the input voltage signal, which may allow the controller device to respond more quickly to changes in the input voltage of the resonant mode power converter circuit.

In some examples, a controller device for a resonant mode power converter circuit comprises a feed-forward pin configured to receive an input voltage signal of the resonant mode power converter circuit, a feedback pin configured to receive an output voltage signal of the resonant mode power converter circuit, processing circuitry configured to determine a switching frequency based on the input voltage signal and the output voltage signal, a first control pin configured to deliver a first control signal to the first switch at the switching frequency, and a second control pin configured to deliver a second control signal the second switch at the switching frequency.

In some examples, a method for controlling a switching frequency of a first switch and a second switch of a resonant mode power converter circuit, the method comprising receiving an input voltage signal of the resonant mode power converter circuit, receiving an output voltage signal of the resonant mode power converter circuit, determining the switching frequency based on the input voltage signal and the output voltage signal, delivering a first control signal to the first switch at the switching frequency, and delivering a second control signal to the second switch at the switching frequency.

In some examples, a controller device for a resonant mode power converter circuit, the controller device comprising a feed-forward pin configured to receive an input voltage signal of the resonant mode power converter circuit during a power saving mode; a feedback pin configured to receive an output voltage signal of the resonant mode power converter circuit; a first control pin configured to deliver control signals to a first switch; a second control pin configured to deliver control signals to a second switch. The controller device further includes processing circuitry configured to cause the first control pin to refrain from delivering control signals to the first switch during the power saving mode, cause the second control pin to refrain from delivering control signals to the second switch during the power saving mode, and determine an initial switching frequency for a burst mode, wherein the burst mode occurs after the power saving mode, and wherein the initial switching frequency is greater than a resonant frequency of the resonant mode power converter circuit. The processing circuitry is further configured to determine a minimum burst switching frequency based on the input voltage signal, wherein the initial switching frequency is less than the resonant frequency, cause the first control pin to deliver a first control signal to the first switch at the initial switching frequency at a beginning of the burst mode, cause the second control pin to deliver a second control signal to the second switch at the initial switching frequency at the beginning of the burst mode, and reduce, during the burst mode, the switching frequency from the initial switching frequency to the minimum burst switching frequency.

The details of one or more examples are set forth in the accompanying drawings and the description below. Other features, objects, and advantages will be apparent from the description and drawings, and from the claims.

DETAILED DESCRIPTION

A controller device for a resonant mode power converter circuit may receive an input voltage signal indicating the input voltage of the resonant mode power converter circuit. The controller device may determine, based on the input voltage signal and an output voltage signal, a switching frequency for control signals that the controller device delivers to two switches of the resonant mode power converter circuit. Using the fed-forward input voltage signal, the controller device may respond more quickly to changes in the input voltage by adjusting the switching frequency based on changes in the input voltage.

In some examples, quickly adjusting the switching frequency may stabilize the output voltage of the resonant mode power converter circuit. Moreover, receiving an input voltage signal at the controller device may allow for larger swings in the input voltage of the resonant mode power converter circuit during normal operation. The feed-forward pin may improve the controller device's ability to plan burst modes for the resonant mode power converter circuit. More effective burst mode may allow for longer standby modes for a power factor correction circuit (PFC) and therefore lower power losses.

Figure 1:
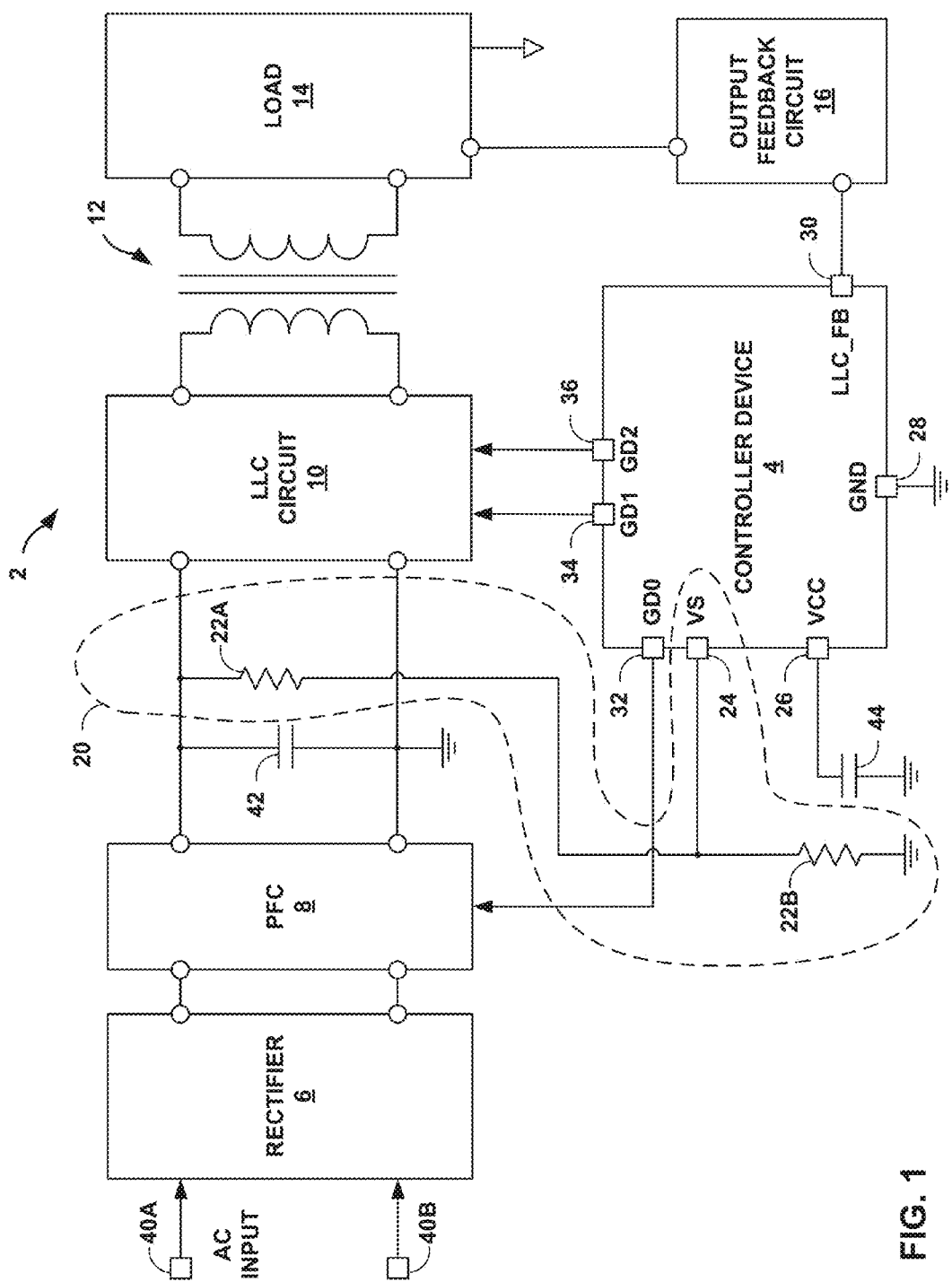
FIG. 1 is a conceptual block and circuit diagram of a resonant mode power converter circuit with a feed-forward circuit, in accordance with some examples of this disclosure.

FIG. 1 is a conceptual block and circuit diagram of a resonant mode power converter circuit 2 with a feed-forward circuit 20, in accordance with some examples of this disclosure. Resonant mode power converter circuit 2 may be configured to receive an input voltage from PFC 8 and deliver an output voltage to load 14. Resonant mode power converter circuit 2 may convert the input voltage to the output voltage with high efficiency. For purposes of this disclosure, resonant mode power converter circuit 2 may include controller device 4, LLC circuit 10, transformer 12, load 14, output feedback circuit 16, and feed-forward circuit 20. In some examples, resonant mode power converter circuit 2 may or may not include rectifier 6 and/or PFC 8.

Controller device 4 in resonant mode power converter circuit 2 may be configured to control the operation of LLC (inductor-inductor-capacitor) circuit 10 through control pins 34, 36. Control pins 34, 36 may be configured to deliver control signals to a first switch and a second switch of LLC circuit 10. Control pins 34, 36 may be referred to as a first gate driver pin (GD1) and a second gate driver pin (GD2) because control pins 34, 36 may be configured to deliver control signals to the control terminals of a first switch and a second switch of LLC circuit 10. Each switch of LLC circuit 10 may conduct electricity based on the voltage at the control terminal of the switch. The control terminal of each switch may include a gate terminal for a field-effect transistor (FET) or a base terminal for a bipolar transistor such as an insulated gate bipolar transistor (IGBT).

As depicted in FIG. 1, controller device 4 may also be configured to control PFC 8 through control pin 32. Control pin 32 may be referred to as a gate driver pin (GD0) because control pin 32 may be configured to deliver control signals to the control terminals of one or more switches of PFC 8. Controller device 4 may further include a power supply pin such as VCC pin 26 for receiving a positive voltage. VCC pin 26 may be electrically connected to a reference voltage such as reference ground by capacitor 44 to smooth fluctuations in the power supply voltage. Controller device 4 may further include a reference pin such as GND pin 28 that is electrically connected to a reference voltage such as reference ground. Controller device 4 may further include a feedback pin such as LLC_FB pin 30. Feedback pin 30 may be configured to receive an output voltage signal from output feedback circuit 16. The output voltage signal may be a scaled-down voltage signal of the output voltage because, in some examples, feedback pin 30 of controller device 4 may be configured to receive voltages of less than three volts or five volts.

Controller device 4 may include processing circuitry configured to determine a switching frequency for the control signals delivered by control pins 34, 36. Control pins 34, 36 may be configured to deliver control signals that cause one switch in LLC circuit 10 to conduct electricity while the other switch does not conduct electricity. The control signals may include dead time during which neither of control pins 34, 36 delivers an enabling control signal and neither switch conducts electricity. One switching cycle or switching period for control pins 34, 36 may include control pin 34 delivering a first control signal, control pin 36 delivering a second control signal, and dead time between the control signals. The control signals may include square waves with a positive period and a negative period for each switching cycle. In some examples, "control signal" may refer to the entire switching period, the positive period for n-channel switches, and/or the negative period for p-channel switches. The enabling period of a control signal may be the period of time during which the control signal enables the respective switch to conduct electricity. Due to dead time, the enabling period of each control signal may be slightly less than fifty percent of the switching cycle.

In some examples, the processing circuitry of controller device 4 may include fixed logical blocks and fixed arithmetic blocks. In some examples, the processing circuitry of controller device 4 may include programmable logic blocks so that a user can modify the variables and thresholds by which the processing circuitry determines the switching frequency. The processing circuitry of controller device 4 may include a voltage-controlled oscillator (VCO) that is configured to adjust the switching frequency by applying a relationship function to one or more input variables such as the voltage signals received by controller device 4 at feed-forward pin 24 and feedback pin 30.

Rectifier 6 may be configured to receive an input signal from alternating-current (AC) input nodes 40A. 40B. AC input nodes 40A, 40B may be electrically connected to a utility power grid or any other suitable power supply. Rectifier 6 may be configured to output a direct-current (DC) signal to PFC 8.

PFC 8 may be configured to receive a DC signal from rectifier 6 and output a corrected DC signal to LLC circuit 10. PFC 8 may be configured to reduce or remove a phase difference between the voltage and current of an electrical signal. For example, a current signal may lag an associated voltage signal such that the apparent power supplied by rectifier 6 is larger than the real power supplied by rectifier 6. To reduce the difference between the apparent power and the real power, PFC 8 may include capacitance or inductance to reduce the reactive power of an electrical signal.

Capacitor 42 may smooth the fluctuations in the input voltage of resonant mode power converter circuit 2. One terminal of capacitor 42 may be connected to a positive input node of LLC circuit 10, and the other terminal of capacitor 42 may be connected to a reference voltage such as reference ground.

LLC circuit 10 may include two switches, two inductors, and a capacitor.

Controller device 4 may control the two switches of LLC circuit 10 through control pins 34, 36. The switches in LLC circuit 10 may form a half-bridge circuit with an output node electrically connected to a first inductor of LLC circuit 10. A second inductor of LLC circuit 10 may be electrically connected between the first inductor and the capacitor of LLC circuit 10. In some examples, resonant mode power converter circuit 2 may include a LCC circuit instead of or in addition to LLC circuit 10, where the LCC circuit includes an additional capacitor.

Transformer 12 may provider galvanic isolation between load 14 and LLC circuit 10. The primary (or left) side of transformer 12 may operate as the second inductor of LLC circuit 10. The primary side and the secondary (or right) side of transformer 12 may be magnetically coupled by flux generated by electrical signals in transformer 12.

Load 14 may be configured to receive an electrical signal, such as a voltage signal, from the secondary side of transformer 12. The voltage signal received by load 14 may be called a magnetization voltage or an output voltage of resonant mode power converter circuit 2. Load 14 may include one or more output capacitors to smooth the magnetization voltage received by load 14. Load 14 may include an electrical load such as a light source, an electric motor, or any other suitable electrical load.

Output feedback circuit 16 may be electrically connected to load 14. Output feedback circuit 16 may be configured to provide galvanic isolation between load 14 and feedback pin 30 of controller device 4. Output feedback circuit 16 may be configured to receive an electrical signal from load 14 or transformer 12 and output an output voltage signal to controller device 4. Therefore, the output voltage signal received by at feedback pin 30 may not include the same voltage level as the electrical signal received by load 14 from transformer 12. Instead, feedback pin 30 may be configured to receive an output voltage signal that is scaled down to a voltage level for an analog-to-digital (ADC) converter inside or outside of controller device 4. In some examples, the ADC may convert analog signals between zero and approximately three volts to a digital signal with a number of bits for use by the processing circuit of controller device 4. In some examples, the ADC may include an upper voltage bound that is different than three volts.

In accordance with the techniques of this disclosure, resonant mode power converter circuit 2 may include feed-forward circuit 20. Feed-forward circuit 20 may include a voltage divider circuit and feed-forward pin 24, which may also be called VS pin 24. The voltage divider circuit of feed-forward circuit 20 may include a first end node that is electrically connected to the input voltage between PFC 8 and LLC circuit 10. The voltage divider circuit of feed-forward circuit 20 may include an intermediate node between elements 22A, 22B and a second end node connected to reference ground. Feed-forward pin 24 may be configured to receive an input voltage signal of the resonant mode power converter circuit. The input voltage signal may be a divided voltage of the input voltage received by LLC circuit 10 from PFC 8, where the input voltage may be equal to the voltage across capacitor 42. Elements 22A, 22B may divide the input voltage received by LLC circuit 10, so that feed-forward pin 24 receives an input voltage signal from the intermediate node at a safe voltage level.

FIG. 1 depicts elements 22A, 22B as resistors, but each of elements 22A, 22B may include capacitors, resistors, and/or other elements. The input voltage signal may be a scaled-down voltage signal of the input voltage because, in some examples, feed-forward pin 24 of controller device 4 may be configured to receive voltages up to approximately three volts. Feed-forward pin 24 may be electrically connected to an ADC to convert the input voltage signal to a digital voltage signal of one or more bits. The ADC may be configured to output the digital voltage signal to the processing circuitry of controller device 4, where the processing circuitry is configured to the determine a switching frequency based on the digital voltage signal.

Controller device 4 may include processing circuitry that is configured to determine a switching frequency for the switches of LLC circuit 10 based on the input voltage signal from feed-forward circuit 20 and the output voltage signal from output feedback circuit 16. The processing circuitry in controller device 4 may be configured to cause control pin 34 to deliver a first control signal to the first switch of LLC circuit 10 at the switching frequency. The processing circuitry in controller device 4 may be configured to cause control pin 36 to deliver a second control signal to the second switch of LLC circuit 10 at the switching frequency.

Increasing the switching frequency of control pins 34, 36 may reduce the output voltage received by load 14, and decreasing the switching frequency may increase the output voltage received by load 14. Therefore, if the input voltage signal received by feed-forward pin 24 decreases, or if the output voltage signal received by feedback pin 30 decreases, the processing circuitry may decrease the switching frequency to increase the output voltage received by load 14. Likewise, if the input voltage signal received by feed-forward pin 24 increases, or if the output voltage signal received by feedback pin 30 increases, the processing circuitry may increase the switching frequency to decrease the output voltage received by load 14.

Feed-forward circuit 20 and feed-forward pin 24 may provide better resolution for the processing circuitry of controller device 4, as compared to another controller that receives only an output voltage signal at a feedback pin. The input voltage of LLC circuit 10 may vary over tens or hundreds of volts, while the output voltage received by load 14 may vary over a smaller scale. Therefore, controller device 4 with feed-forward pin 24 and feedback pin 30 may provide finer resolution than a controller with only a feedback pin. Controller device 4 may allow resonant mode power converter circuit 2 to operate across a wider range of input voltages, as compared to another resonant mode power converter circuit without a feed-forward circuit. Moreover, feed-forward pin 24 may provide an upstream (and quick) indication of a change in the input voltage of LLC circuit 10, whereas feedback pin 30 may provide a downstream (and slower) indication of the change in the input voltage. Thus, controller device 4 with feed-forward pin 24 may respond more quickly to changes in the input voltage than another controller without a feed-forward pin.

The techniques of this disclosure may allow a wider range of input voltages and output voltages. Resonant mode power converter circuit 2 may be less expensive than other resonant mode power converter circuits because the capacitors, such as capacitor 42 and output capacitors in load 14, may be smaller than those of other resonant mode power converter circuits, due to the wider voltage ranges. Controller device 4 may regulate the output voltage more effectively, as compared to other controller devices, allowing for smaller capacitors to be used for capacitor 42 and the output capacitors in load 14. For example, the output capacitors may hold less charge and/or less voltage because controller device 4 may respond more quickly to changes in the input voltage, output voltage, and output load, as compared to other controller devices.

Figure 2:
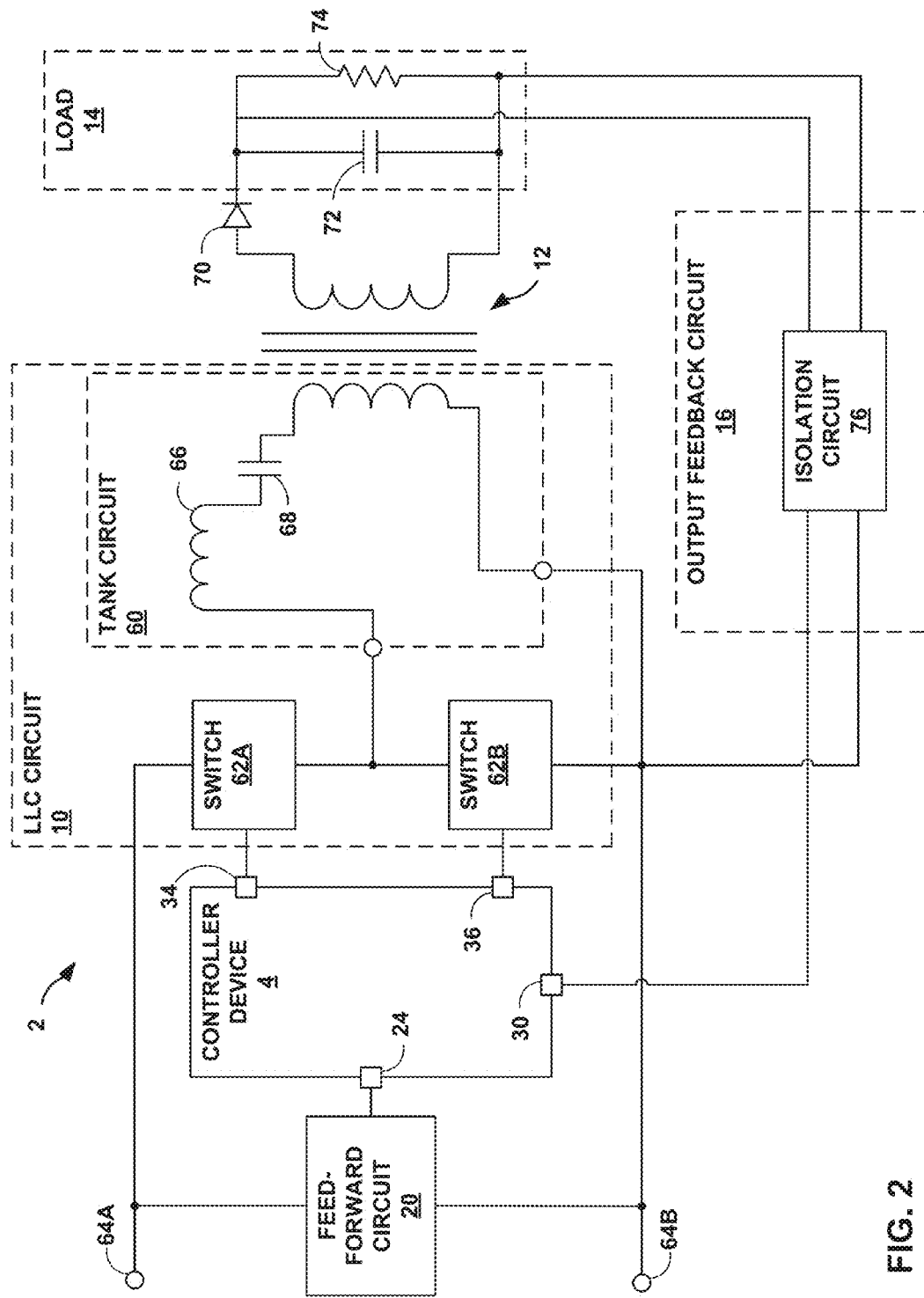
FIG. 2 is a conceptual block and circuit diagram of a resonant mode power converter circuit, in accordance with some examples of this disclosure.

FIG. 2 is a conceptual block and circuit diagram of a resonant mode power converter circuit 2, in accordance with some examples of this disclosure. FIG. 2 provides additional detail for resonant mode power converter circuit 2 of FIG. 1. FIG. 2 depicts resonant mode power converter circuit 2 as including controller device 4, LLC circuit 10, transformer 12, load 14, output feedback circuit 16, and input feed-forward circuit 20.

LLC circuit 10 may receive an input signal from input nodes 64A, 64B, which may be electrically connected to PFC 8, as shown in FIG. 1. Feed-forward circuit 20 may divide the voltage at input node 64A and deliver an input voltage signal to feed-forward pin 24. In some examples, feed-forward circuit 20 may include a switch to disconnect the voltage divider of feed-forward circuit 20 from input node 64A in order to reduce power losses in feed-forward circuit 20 when feed-forward pin 24 is not sensing the input voltage signal. In some examples, the voltage divider of feed-forward circuit 20 may include high resistance to reduce power losses in feed-forward circuit 20. Input node 64A may be electrically connected to a load terminal of switch 62A. Input node 64B may be electrically connected to a reference voltage, a load terminal of switch 62B, and isolation circuit 76 of output feedback circuit 16.

Switches 62A, 62B may include, but are not limited to, any type of FET, a bipolar junction transistor (BJT), an IGBT, a high-electron-mobility transistor (HEMT), a gallium-nitride (GaN) based transistor, or another element that uses voltage for its control. Switches 62A, 62B may include n-type transistors or p-type transistors, and switches 62A, 62B may include vertical power transistors. For a vertical power transistor, the source (or emitter) terminal and the drain (or collector) terminal may be on opposite sides or opposite surfaces of the transistor or semiconductor switch. Current in a vertical power transistor may flow through the transistor from top to bottom or from bottom to top. In some examples, switches 62A, 62B may include lateral transistors or horizontal transistors that may offer certain benefits such as ease of fabrication and cost. In some examples, switches 62A, 62B may include other analog devices such as diodes. Switches 62A, 62B may also include freewheeling diodes connected in parallel with switches 62A, 62B to prevent reverse breakdown of the switches.

Switches 62A, 62B may include three terminals: two load terminals and at least one control terminal. For MOSFET switches, switches 62A, 62B may include a drain terminal, a source terminal, and a gate terminal. For IGBT switches or BJT switches, switches 62A, 62B may include a collector terminal, an emitter terminal, and a base terminal. Switches 62A, 62B may conduct electricity between load terminals (i.e., drain and source), based on the voltage delivered to the control terminal (i.e., gate) by one of control pins 34, 36.

Switches 62A, 62B may include various material compounds, such as silicon (Si), silicon carbide (SiC), Gallium Nitride (GaN), or any other combination of one or more semiconductor materials. To take advantage of higher power density requirements in some circuits, power converters may operate at higher frequencies. In some examples, SiC switches may experience lower switching power losses. Improvements in magnetics and faster switching, such as Gallium Nitride (GaN) switches, may support higher frequency converters. These higher frequency circuits may require control signals to be sent with more precise timing, as compared to lower-frequency circuits.

Tank circuit 60 may include inductor 66, capacitor 68, and a primary side of transformer 12. Tank circuit 60 may include a frequency response that is based on the inductances and capacitances of the components in tank circuit 60, as well as the characteristics of load 14.

Load 14 may include output capacitor 72 and resistive load 74. In some examples, load 14 may include an inductive load not shown in FIG. 2. Capacitor load 72 may include one or more output capacitors that may smooth the output voltage of resonant mode power converter circuit 2. The output voltage of resonant mode power converter circuit 2 may be applied across resistive load 74. Diode 70 may prevent reverse current flow through the secondary side of transformer 12. Diode 70 may also prevent the output voltage of resonant mode power converter circuit 2 from going below zero.

Output feedback circuit 16 may include isolation circuit 76 for providing galvanic isolation between load 14 and controller device 30. Isolation circuit 76 may include an isolation component, such as a transformer, an opto-coupler, or any other suitable isolation component. Isolation circuit 76 may receive the output voltage across load 14 and deliver an output voltage signal to feedback pin 30 of controller device 4.

Figure 3:
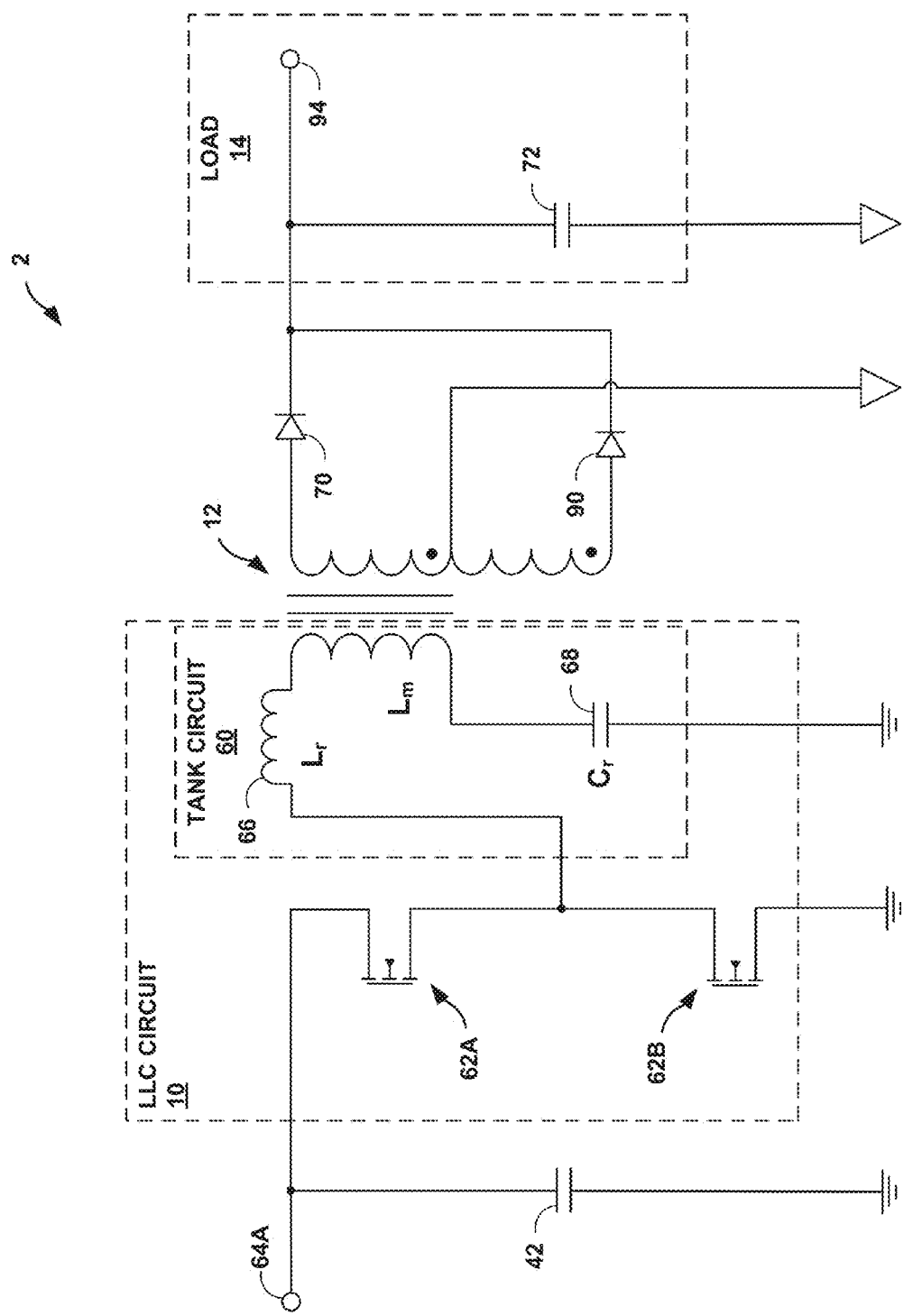
FIG. 3 is a circuit diagram of a resonant mode power converter circuit, in accordance with some examples of this disclosure.

FIG. 3 is a circuit diagram of a resonant mode power converter circuit 2, in accordance with some examples of this disclosure. The input voltage of resonant mode power converter circuit 2 may be measured between input node 64A and reference ground. The output voltage of resonant mode power converter circuit 2 may be measured between output node 94 and reference ground.

FIG. 3 depicts tank circuit 60 as including inductor 66, which is labeled as $L_r$ for "resonant inductor." Tank circuit 60 may also include the primary side of transformer 12, which is labeled $L_m$ for "magnetization inductor." Tank circuit 60 may also include capacitor 68, which is labeled $C_r$ for "resonant capacitor." The secondary side of transformer 12, as depicted in FIG. 3, may include diodes 70, 90 for allow forward currents and reverse currents to reach load 14 while preventing a negative voltage at output node 94. In addition, the middle of the secondary side of transformer 12 may be grounded.

Figure 4:
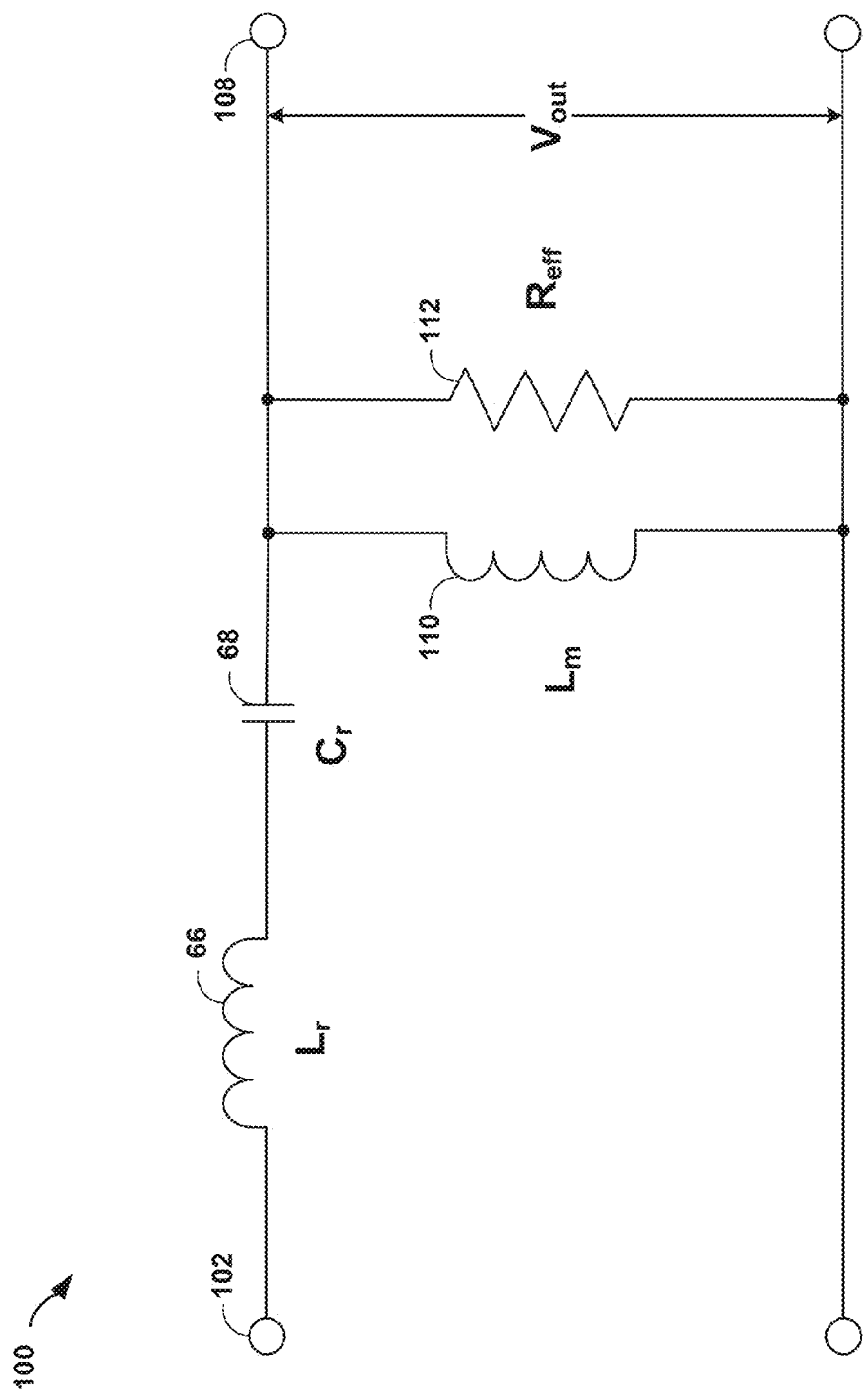
FIG. 4 is a circuit diagram of another equivalent tank circuit based on a first harmonic approximation.

FIG. 4 is a circuit diagram of another equivalent tank circuit 100 based on a first harmonic approximation. Equivalent tank circuit 100 includes inductor 66 and capacitor 68, which may have the same inductance and capacitance as the modeled tank circuit in FIGS. 1-3. Similarly, inductor 110, positioned in parallel with effective resistance 112, may have an equivalent inductance as the primary side of transformer 12. The effective resistance 112 ($R_{eff}$) of load 14, equivalent turns ratio ($n_e$), and ratio (m) of the primary inductance ($L_p$) and the resonant inductance ($L_r$), may be expressed in the following equation:

$$R_{eff} = \frac{8}{\pi^2} n_e^2 \frac{V_o}{I_o} \quad (1)$$

$$n_e = \frac{2(V_o + V_f)}{M_v + V_{in}} \quad (2)$$

$$M_v = \frac{m}{m-1} \quad (3)$$

$$m = \frac{L_p}{L_r} = \frac{L_m + L_r}{L_r} \quad (4)$$

The voltage between input node 102 and reference ground may correspond to the input voltage for tank circuit 60 in FIGS. 2-3. The voltage between output node 108 and reference ground may correspond to the voltage across load 14 in FIGS. 1-3. Equivalent tank circuit 100 may simplify the modeling of the output voltage at output node 108.

Figure 5:
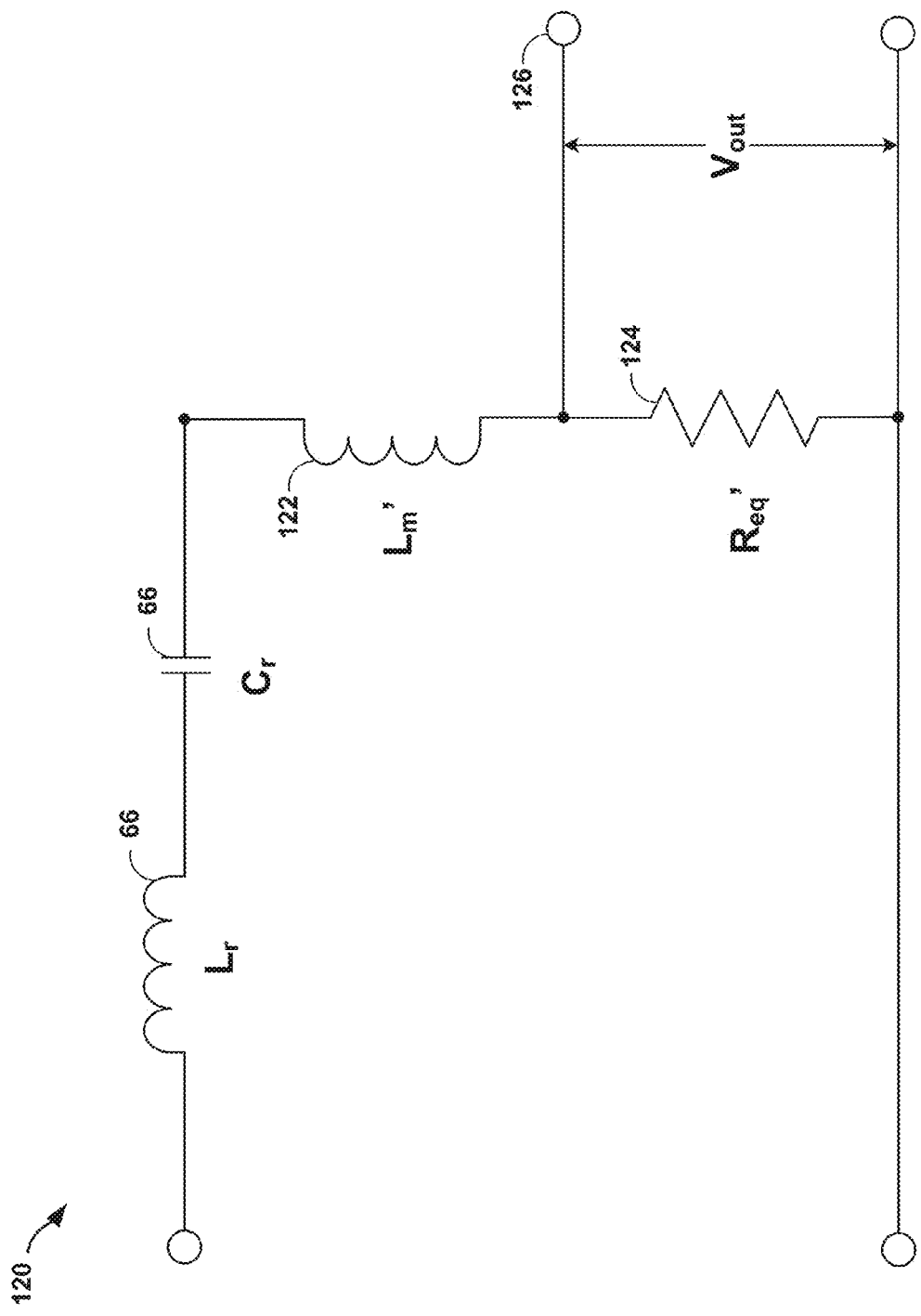
FIG. 5 is a circuit diagram of an equivalent tank circuit, in accordance with some examples of this disclosure.

FIG. 5 is a circuit diagram of an equivalent tank circuit 120, in accordance with some examples of this disclosure. Equivalent tank circuit 120 may include inductor 122 in series with effective resistance 124. The output voltage may be measured at output node 126 with respect to reference ground. The relevant equations for FIG. 5 include:

$$L'_m = \frac{\text{Im}(R_{AC} \| X_m)}{2\pi f}; \text{ where } X_m = 2\pi f L_m \quad (5)$$

$$R'_{eq} = \text{Re}(R_{eff} \| X_m) \quad (6)$$

$$F = \frac{f}{f_r}; \text{ where } f_r = \frac{1}{2\pi\sqrt{L_r C_r}} \quad (7)$$

$$Q_e = \frac{\sqrt{L_r + \frac{L_{dyn}}{C_r}}}{R_{eff}} = \frac{\sqrt{\frac{L_r}{C_r}} \pi^2 P_o}{8(V_o + V_f)^3 V_o} V_{in}^2; \text{ where } L_{dyn} = \frac{R_{eff}^2 \times R X_m}{2\pi(R_{eff}^2 + X_m^2)} \quad (8)$$

For equations (5) and (7), f represents the switching frequency, $f_r$ represents the resonant frequency of the tank circuit, and $Q_e$ represents the LLC circuit converter factor. Assuming full-load analysis where the effective resistance ($R_{eff}$) is small, $L_{dyn}$ is approximately equal to zero. The equations for the voltage gain of resonant mode power converter circuit 2 are given below.

$$M_j(F, Q) = \left| \frac{jX_{Lm} \| R_e}{(jX_{Lm} \| R_e) + j(X_{Lr} - X_{Cr})} \right| = \left| \frac{F^2(m-1)}{(F^2 m - 1) + jF(F^2 - 1)(m-1)Q_e} \right| \quad (9)$$

$$G(F, Q) = \sqrt{\text{Re}(M_j(F, Q_e))^2 + \text{Im}(M_j(F, Q_e))^2} \quad (10)$$

$$G(F, V_{in}, P_o) \geq M_v = \frac{(V_o + V_f)}{V_{in}} \quad (11)$$

$$G(F, V_{in}, P_o) = \sqrt{\text{Re}(M_j(F, f_{Q_{eff}}(V_{in}, P_o)))^2 + \text{Im}(M_j(F, f_{Q_{eff}}(V_{in}, P_o)))^2} \quad (12)$$

$$F_p = \frac{1}{2\pi}\sqrt{(L_r + L_{dyn})C_r} \quad (13)$$

Figure 6:
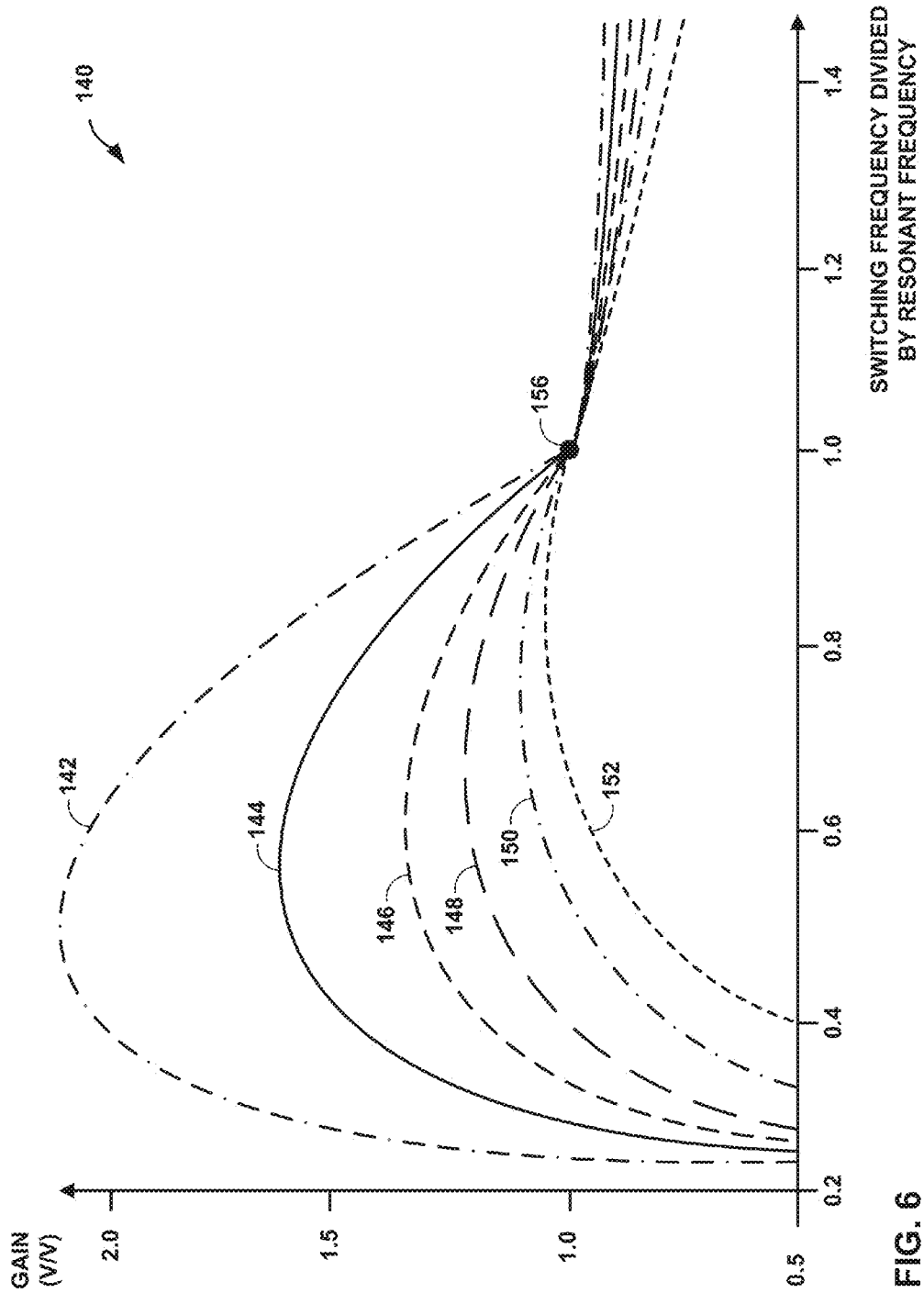
FIG. 6 is a graph of voltage gain as a function of the switching frequency based on the quality factor of a tank circuit, in accordance with some examples of this disclosure.

FIG. 6 is a graph 140 of voltage gain as a function switching frequency based on the quality factor of a tank circuit, in accordance with some examples of this disclosure. The horizontal axis of graph 140 may represent the ratio of switching frequency to the resonant frequency. At point 156, the switching frequency may equal the resonant frequency such that the ratio is one. The vertical axis of graph 140 may represent the voltage gain of resonant mode power converter circuit 2, expressed in volts over volts.

Curves 142-152 may represent six different LLC circuit converter factors ($Q_e$). Curve 142 may represent a converter factor of zero, curve 144 may represent a converter factor of three tenths, curve 146 may represent a converter factor of four tenths, curve 148 may represent a converter factor of one half, curve 150 may represent a converter factor of six tenths, and curve 152 may represent a converter factor of eight tenths.

Each curve may have a peak voltage gain at a particular switching frequency, where the particular frequency is different for each of curves 142-152. For example, the voltage gain of curve 142 may peak near half of the resonant frequency. In contrast, the voltage gain of curve 152 may peak near the resonant frequency. At switching frequencies of less than the peak voltage gain, resonant mode power converter circuit 2 may operate in capacitive mode, which may not be desirable. Resonant mode power converter circuit 2 may have a maximum allowable voltage gain, such as one-and-one-half volts over volts or one-and-one-fourth volts over volts. A designer may choose the resonant inductance and resonant capacitance based on the converter factor with a peak voltage gain that is near but does not exceed the maximum allowable voltage gain.

Figure 7:
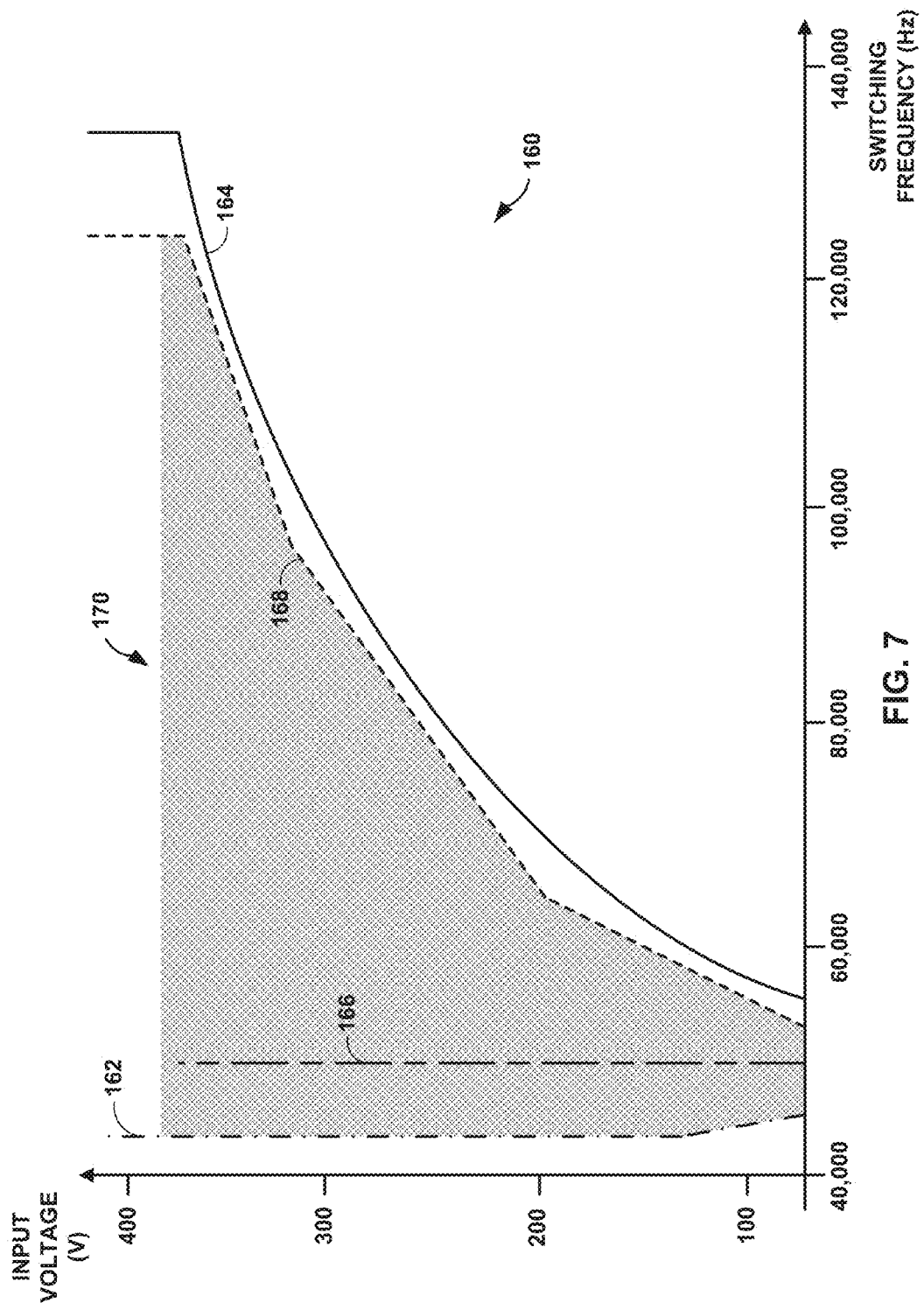
FIG. 7 is a graph showing the upper and lower boundaries for switching frequency as a function of input voltage, in accordance with some examples of this disclosure.

FIG. 7 is a graph 160 showing the upper and lower boundaries 162, 164 for switching frequency as a function of input voltage, in accordance with some examples of this disclosure. The horizontal axis of graph 160 may represent switching frequency, spanning from forty kilohertz to one hundred and forty kilohertz. The vertical axis of graph 160 may represent the input voltage of resonant mode power converter circuit 2, spanning from eighty volts to four hundred volts. The example depicted in FIG. 7 may correspond to an output power of two watts, a resonant inductance of one hundred and thirty-four microhenries, a magnetization inductance of five hundred microhenries, and a resonant capacitance of twenty nanofarads.

Vertical line 166 may represent the resonant frequency of LLC circuit 10, as expressed by equation (7). In some examples, the resonant frequency may be approximately fifty kilohertz. Lower boundary 162 may represent the lowest switching frequency at which the voltage gain of resonant mode power converter circuit 2 remains within an acceptable range. At switching frequencies below lower boundary 162, the voltage gain may be too large or resonant mode power converter circuit 2 may operate in capacitive mode. At switching frequencies above lower boundary 162, resonant mode power converter circuit 2 may operate in inductive mode, which may be preferable to capacitive mode in some examples. Lower boundary 162 may be approximately forty-five kilohertz.

Upper boundary 164 may delineate the switching frequencies at which the voltage gain of resonant mode power converter circuit 2 decreases below an acceptable number. When the switching frequency is higher than upper boundary 164, the voltage gain may decrease, and the output voltage may not be sufficiently high to adequately drive load 14 in some examples. The switching frequency at upper boundary 164 may increase as the input voltage increases. Above a certain input voltage, such as three hundred and sixty volts, upper boundary 164 may remain stable as depicted in FIG. 7. Region 170 may represent the allowable switching frequencies for the control signals delivered by the control pins 34, 36 of controller device 4.

Approximation 168 may include a piecewise continuous equation for upper boundary 164. In some examples, the processing circuitry of controller device 4 may quickly determine an upper boundary of the switching frequency by applying approximation 168 to an input voltage signal. As shown in FIG. 7, approximation 168 may include four straight lines, each of which may include lower switching frequencies than upper boundary 164. By using approximation 168, controller device 4 may therefore avoid crossing upper boundary 164. Controller device 4 may more easily calculate approximation 168 than a polynomial equation or an exponential equation for upper boundary 164.

Figure 8:
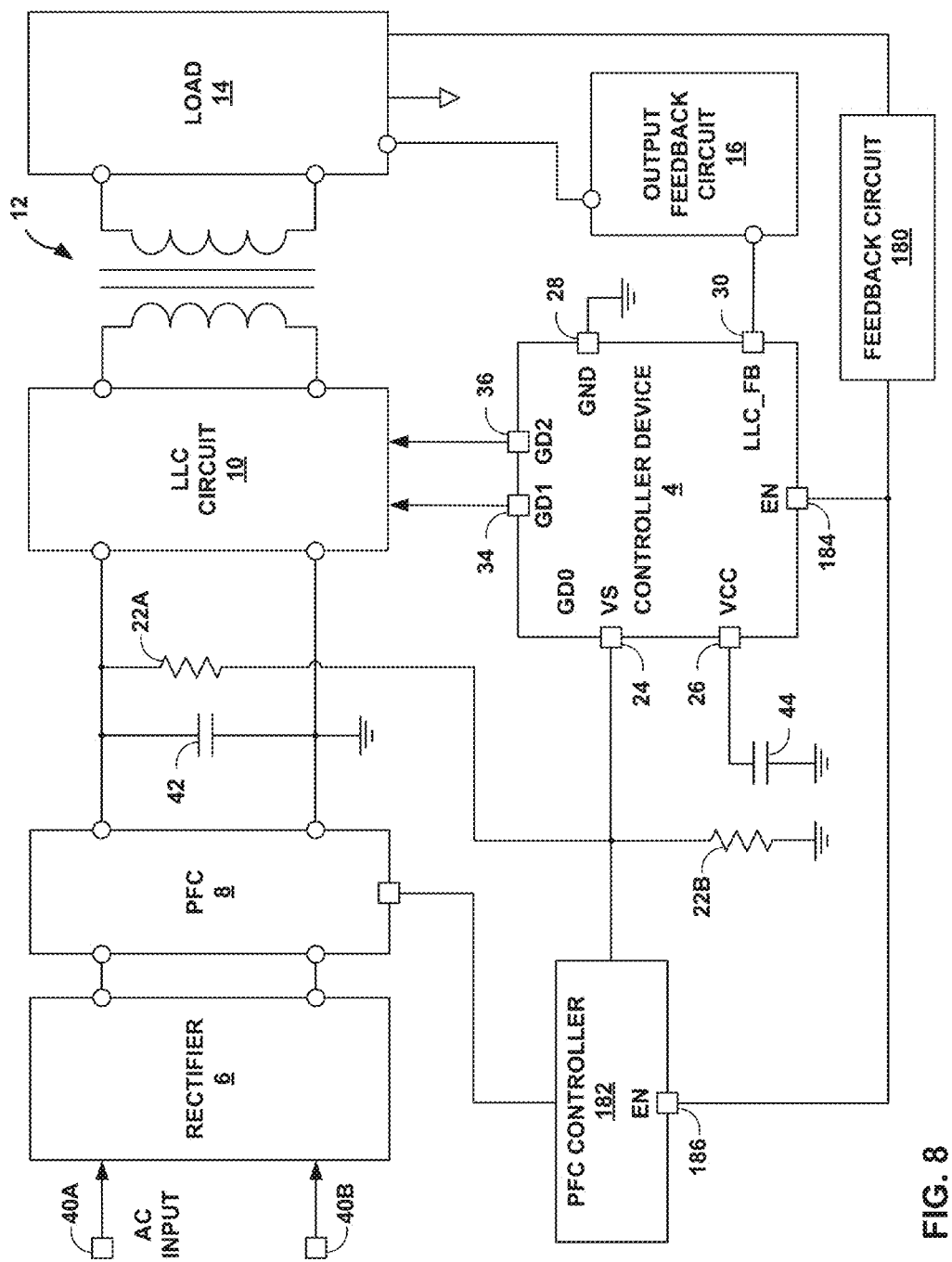
FIG. 8 is a circuit diagram of a resonant mode power converter circuit, in accordance with some examples of this disclosure.

FIG. 8 is a circuit diagram of a resonant mode power converter circuit 2, in accordance with some examples of this disclosure. Resonant mode power converter circuit 2 may include PFC controller 182 as a separate controller device for PFC 8. In some examples, PFC controller 182 and controller device 4 may be integrated into a single device.

Resonant mode power converter circuit 2 may include feedback circuit 180 which may deliver an electrical signal to enable pins 184, 186 of PFC controller 182 and controller device 4. PFC controller 182 and/or controller device 4 may cease some or all of their operations based on the electrical signal at enable pins 184, 186. For example, if load 14 decreases because of standby mode or some other reason, PFC controller 182 may cause PFC 8 into a standby mode or a power saving mode to conserve energy. During a standby mode, resonant mode power converter circuit 2 may deliver a lower voltage to load 14.

Figure 9:
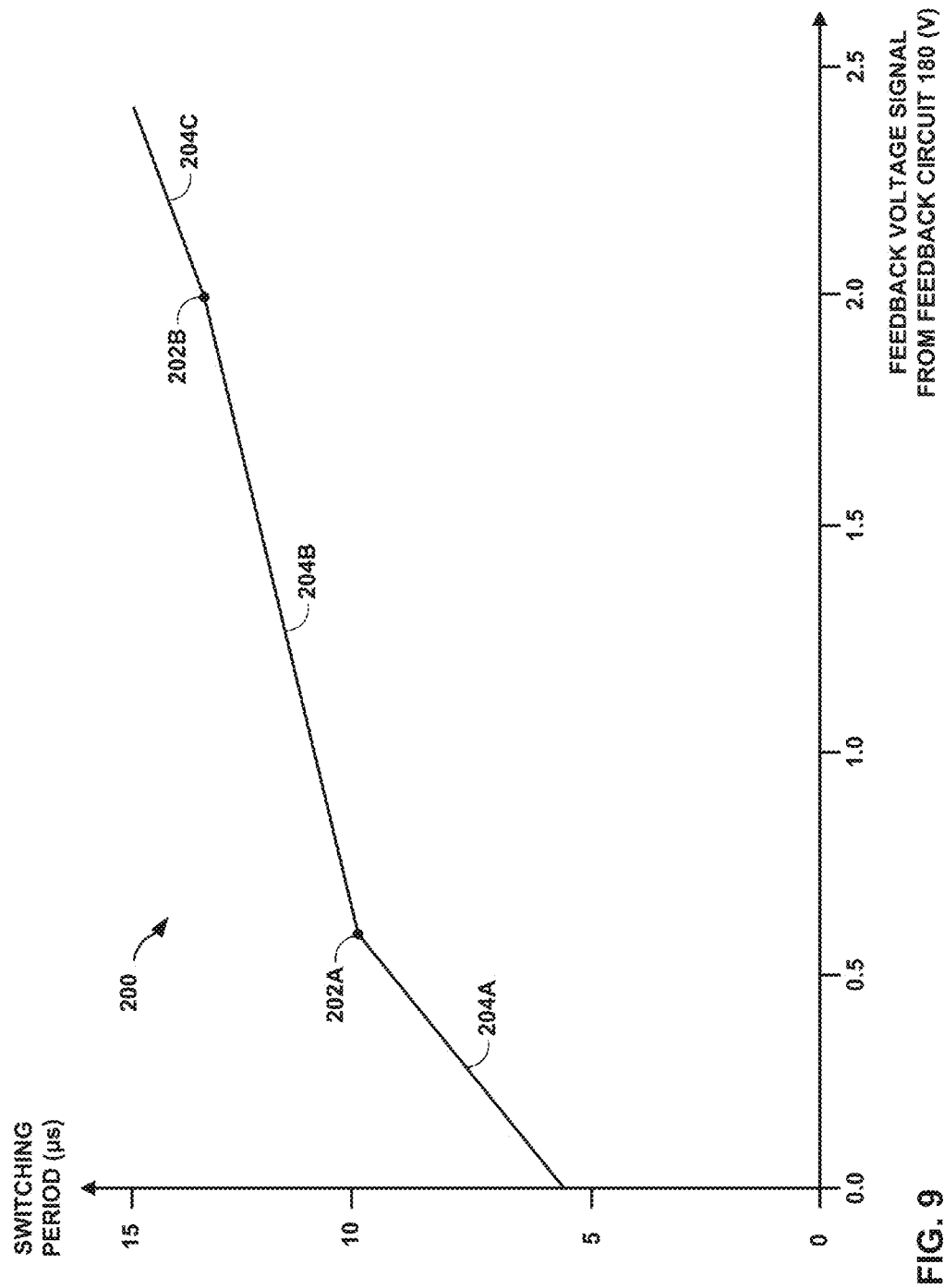
FIG. 9 is a graph of a piecewise continuous function relating switching period and an output voltage signal, in accordance with some examples of this disclosure.

FIG. 9 is a graph 200 of a piecewise continuous function relating switching period and a feedback voltage signal, in accordance with some examples of this disclosure. The horizontal axis of graph 200 may represent a feedback voltage signal received by feedback pin 30 in volts. The feedback voltage may include an output voltage signal, such as a divided voltage of the output voltage received by load 14, so that the ADC that is inside or connected to controller device 4 can convert the feedback voltage signal to a digital voltage signal. The ADC may have an input range from zero volts to two-and-four-tenths volts. The vertical axis of graph 200 may represent the switching period in microseconds, spanning from zero to fifteen microseconds. The switching frequency may be the inverse of the switching period, such that a switching period of fifteen microseconds is equal to a switching frequency of approximately sixty-seven kilohertz.

Graph 200 may include a piecewise equation including lines 204A-204C. Controller device 4 may quickly calculate a switching period or a switching frequency based on a feedback voltage signal using lines 204A-204C, as compared to a polynomial equation or an exponential equation. A piecewise equation including lines 204A-204C may therefore conserve energy and time for the processing circuitry of controller device 4.

Lines 204A, 204C may have steeper slopes than line 204B to cause the voltage gain to increase or decrease towards a desirable number. For example, when the feedback voltage signal increases above two volts at point 202B, the processing circuitry of controller device 4 may apply line 204C to the feedback voltage signal, which may result in a higher switching period, a lower switching frequency, and higher voltage gain. When the feedback voltage signal decreases below sixth tenths of one volt at point 202A, the processing circuitry of controller device 4 may apply line 204A to the feedback voltage signal, which may result in a lower switching period, a higher switching frequency, and lower voltage gain.

The processing circuitry of controller device 4 may include a VCO with a piecewise relationship function defined by lines 204A-204C. The relationship function may target a midpoint of line 204B as the operating point for load 14. Lines 204A, 204C allow for wider swings of the output voltage across load 14.

Figure 10:
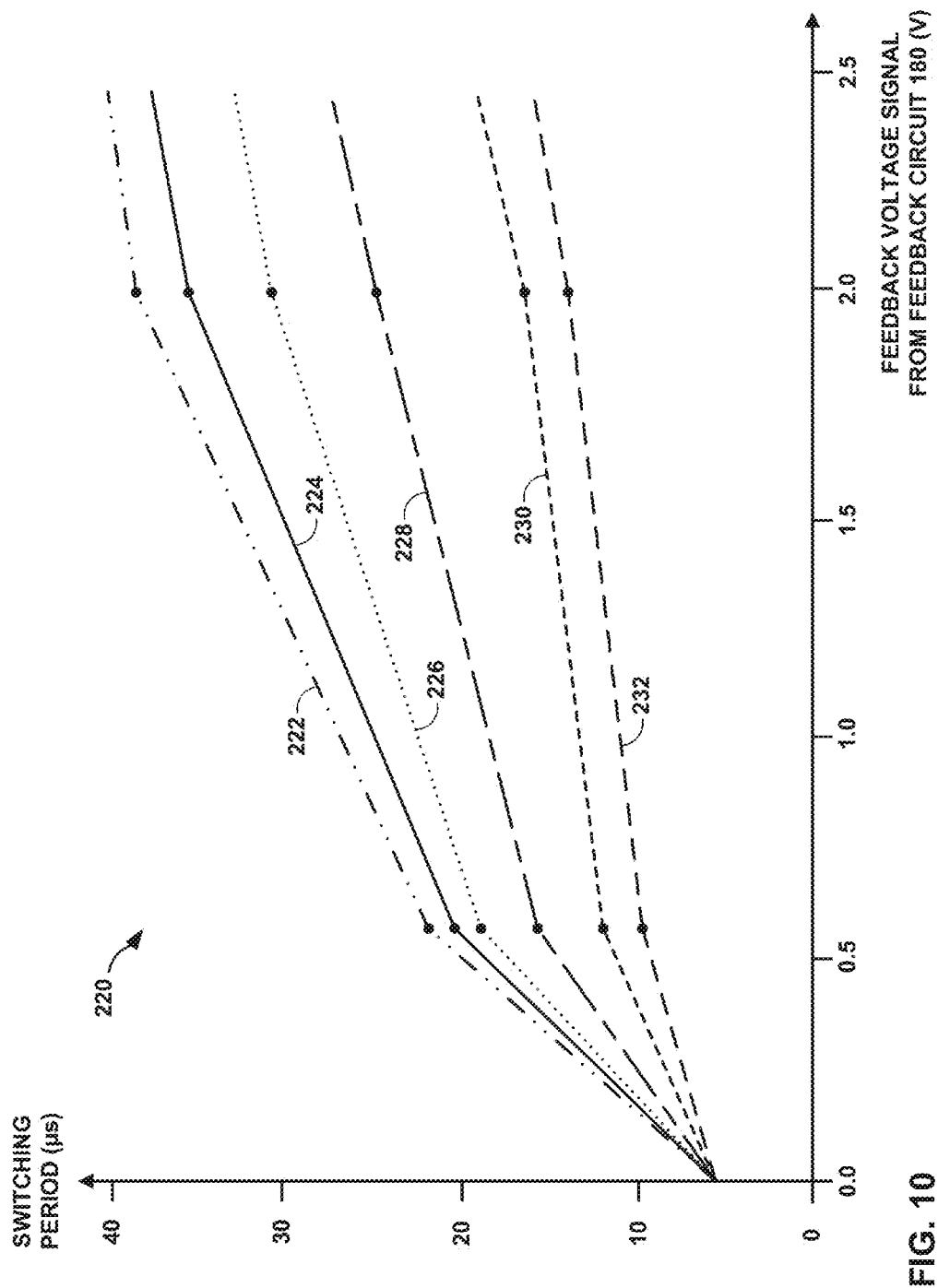
FIG. 10 is a graph of six piecewise continuous functions relating switching period and output voltage signal based on an input voltage signal, in accordance with some examples of this disclosure.

FIG. 10 is a graph 220 of six piecewise continuous functions relating switching period and feedback voltage signal based on an input voltage signal, in accordance with some examples of this disclosure. The horizontal axis of graph 220 may represent the feedback voltage signal, such as an output voltage signal, received at feedback pin 30 in volts. The feedback voltage signal may be a divided voltage of the output voltage received by load 14, so that the ADC inside of or connected to controller device 4 can convert the feedback voltage signal to a digital signal. The vertical axis of graph 220 may represent the switching period in microseconds, spanning from zero to forty microseconds.

The processing circuitry of controller device 4 may apply one of relationship functions 222-232 to the feedback voltage signal received at feedback pin 30. The processing circuitry may apply relationship function 222 when the input voltage of resonant mode power converter circuit 2 is approximately one hundred and twenty volts. Controller device 4, at feed-forward pin 24, may receive an indication of the input voltage. The processing circuitry may apply relationship function 224 when the input voltage is approximately one hundred and fifty-five volts. The processing circuitry may apply relationship function 226 when the input voltage is approximately two hundred volts. The processing circuitry may apply relationship function 228 when the input voltage is approximately two hundred and fifty-five volts. The processing circuitry may apply relationship function 230 when the input voltage is approximately three hundred and twenty-five volts. The processing circuitry may apply relationship function 232 when the input voltage is approximately three hundred and seventy-five volts. According to FIG. 10, as the input voltage increases, the switching periods may decrease, the switching frequencies may increase, and the voltage gains may decrease.

Relationship functions 222-232 may include two input variables: the input voltage signal and the feedback voltage signal. Relationship functions 222-232 may include the switching frequency as an output variable that is based on the input voltage signal and the feedback voltage signal. In general, for higher-voltage input voltage signals and/or feedback voltage signals, the processing circuitry will determine a relatively high switching frequency to reduce the voltage gain. Likewise, for lower-voltage input voltage signals and/or feedback voltage signals, the processing circuitry will determine a relatively low switching frequency to increase the voltage gain.

In some examples, for a given feedback voltage signal, the processing circuitry may apply a piecewise continuous function including at least two functions. When the input voltage signal is less than a predetermined input voltage level, the processing circuitry may be configured to determine a first switching frequency. When the input voltage signal is greater than the predetermined input voltage level, the processing circuitry may be configured to determine a second switching frequency that is higher than the first switching frequency.

Figure 11:
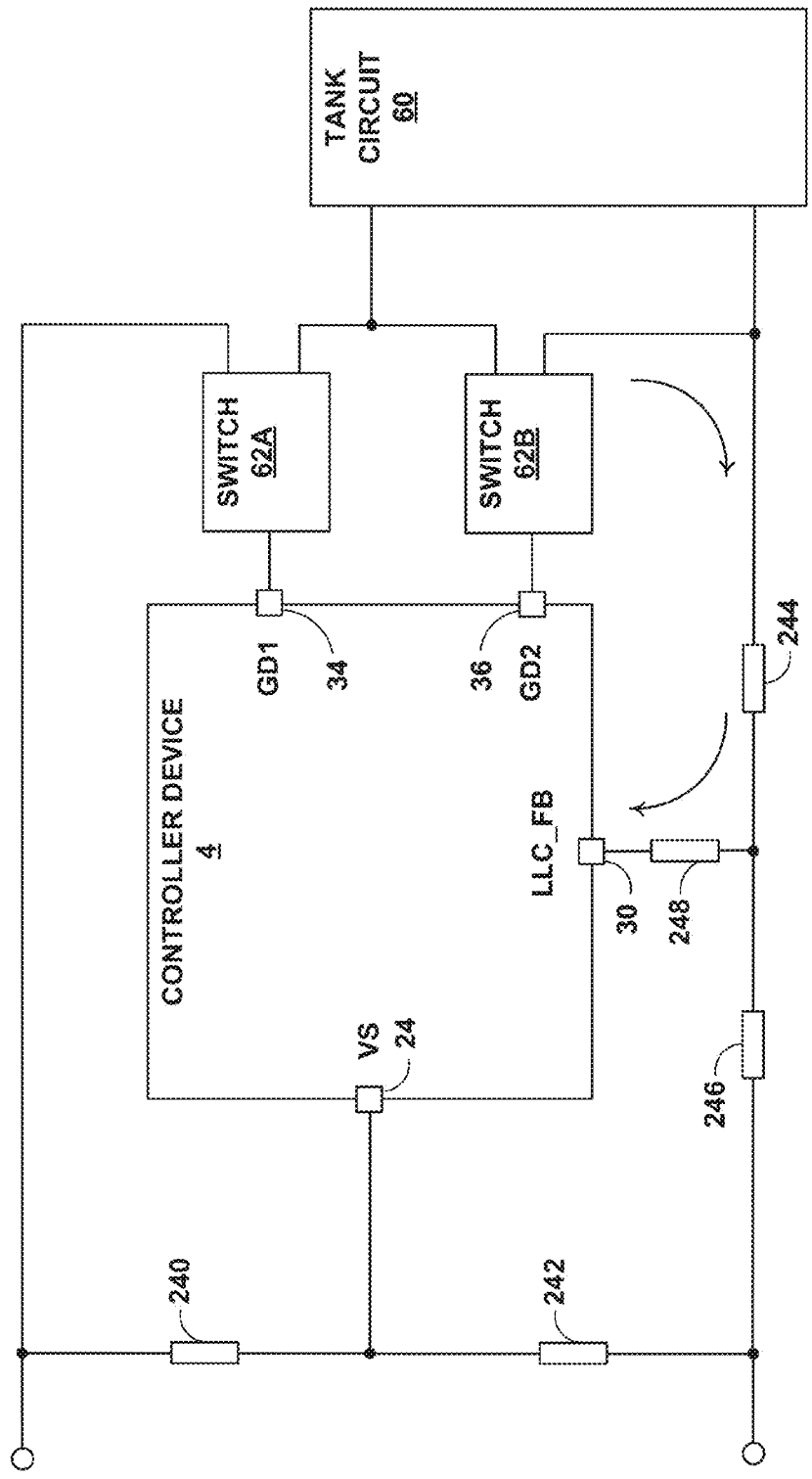
FIG. 11 is a conceptual block and circuit diagram of an LLC converter circuit including a pre-sensing scheme, in accordance with some examples of this disclosure.

FIG. 11 is a conceptual block and circuit diagram of an LLC converter circuit including a pre-sensing scheme, in accordance with some examples of this disclosure. The pre-sensing scheme of FIG. 11 may include dividing elements 240, 242, which may include resistors, capacitors, and/or any other suitable dividing elements. Dividing element 240 may include a relatively high impedance, as compared to the impedance of dividing element 242. Dividing elements 240, 242 may prevent system noise such as parasitics from influencing the input voltage signal received at feed-forward pin 24. Elements 244, 246, 248 may provide impedance between tank circuit 60 and feedback pin 30.

When load 14 is in standby mode or a low-power mode, controller device 4 may enter a power saving mode and/or disable or turn off PFC 8. During the power saving mode, the processing circuitry of controller device 4 may cause control pins 34, 36 to refrain from delivering control signals to switches 62A, 62B. During the power saving mode, the voltage across load 14 may decrease until controller device 4 initiates a burst mode to increase the voltage across load 14. The processing circuitry of controller device 4 may determine when to initiate a burst mode by sensing the output voltage signal at feedback pin 30. The processing circuitry of controller device 4 may also determine an initial switching frequency of the burst mode by sensing the output voltage signal at feedback pin 30.

Figure 12A:
FIGS. 12A-12E are graphs of a burst mode for a resonant mode power converter circuit, in accordance with some examples of this disclosure.
Figure 12B:

FIGS. 12A-12E are graphs of a burst mode for a resonant mode power converter circuit, in accordance with some examples of this disclosure. FIG. 12A may depict the duration of the burst mode. FIG. 12B may depict the switching frequency during the burst mode. The initial switching frequency and the final switching frequency during the burst mode may be higher than minimum burst switching frequency, which may occur at or near the middle of the burst mode.

Figure 12C:
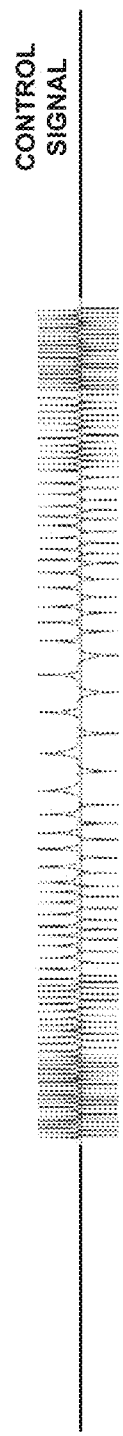
Figure 12D:
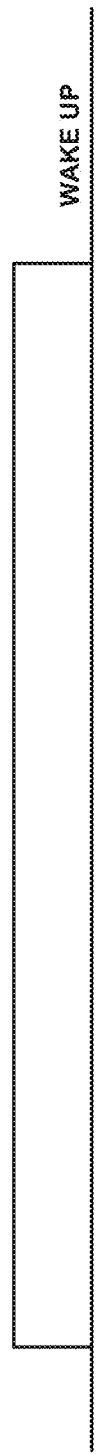
Figure 12E:
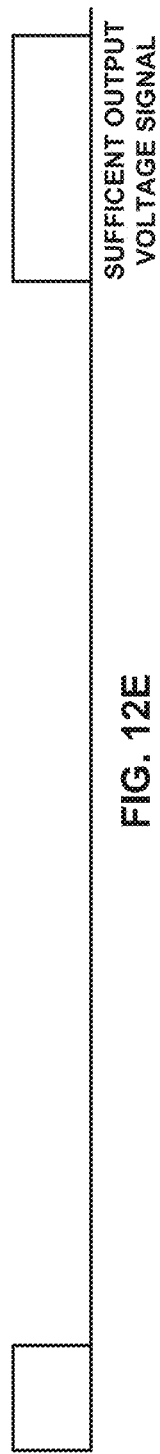

FIG. 12C may depict a control signal that may be delivered by one or both of control pins 34, 36 to switches 62A, 62B during the burst mode. When the control signal is zero, neither of switches 62A, 62B may conduct electricity. In some examples, when the control signal is positive, switch 62A may conduct electricity. In some examples, when the control signal is negative, switch 62B may conduct electricity. The spacing between spikes in FIG. 12C may represent the frequency, which may be at a minimum burst switching frequency at the middle of the burst mode. FIG. 12D may depict the wake-up signal that the processing circuitry may generate or receive. The wake-up period may begin before the switching period begins in FIG. 12A, so that the processing circuitry can prepare for the switching period. FIG. 12E may depict the sufficient output voltage signal received at feedback pin 30. When the output voltage is sufficient, controller device 4 may return to a power saving mode. During the power saving mode, controller device 4 may periodically sense the input voltage and the output voltage to determine if another burst mode is needed.

In some examples, a burst mode sequence, as depicted in FIGS. 12A-12C, may include a duration on the order of one or two milliseconds. A pre-sensing sequence for determining whether to initiate a burst mode may include a duration on the order of fifty or one hundred microseconds. The pre-sensing sequence, which is sensing before driving the gate switching, may include closing a switch of feed-forward circuit 20 to allow feed-forward pin 24 to receive an input voltage signal. Additionally or alternatively, the pre-sensing sequence may include closing a switch of output feedback circuit 16 to allow feedback pin 30 to receive an output voltage signal. In some examples, the power saving mode between burst modes may include a duration on the order of fifty or two hundred milliseconds.

Figure 13:
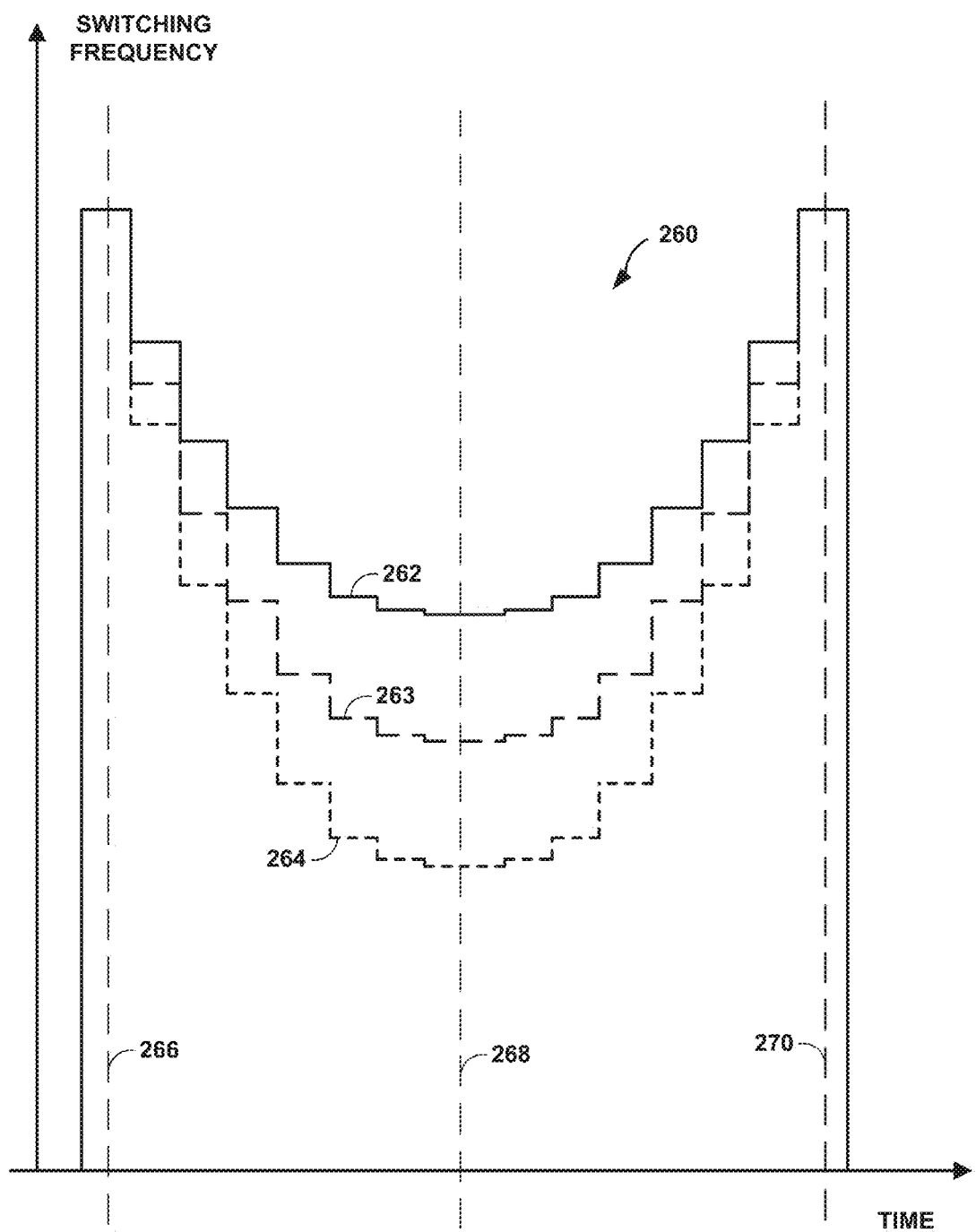
FIG. 13 is a graph of switching frequency over time, in accordance with some examples of this disclosure.

FIG. 13 is a graph 260 of switching frequency over time, in accordance with some examples of this disclosure. The horizontal axis of graph 260 may represent time during a burst mode. The vertical axis of graph 260 may represent the switching frequency during the burst mode. At the far left-hand side of graph 260 before time 266, the switching frequency may be zero during a power saving mode such as a standby mode. During the power saving mode, the processing circuitry of controller device 4 may cause control pins 34, 36 to refrain from delivering control signals to switches 62A, 62B, such that switches 62A, 62B do not conduct electricity. During the power saving mode, the processing circuitry may disconnect control pins 34, 36 from a voltage source. The power saving mode may occur during a period when PFC 8 is not actively correcting the power factor of an electrical signal from AC input nodes 40A, 40B.

During the power saving mode, controller device 4 may sense an input voltage signal and an output voltage signal. The processing circuitry of controller device 4 may determine whether to initiate a burst mode based on the input voltage signal and the output voltage signal. The processing circuitry may determine an initial switching frequency for the burst mode. The processing circuitry may determine a minimum burst switching frequency based on the input voltage signal and the output voltage signal.

At the beginning of the burst mode at time 266, the processing circuitry may cause control pins 34, 36 to deliver control signals to switches 62A, 62B at the initial switching frequency. The processing circuitry may then reduce the switching frequency to a minimum burst switching frequency over one or more steps. As depicted in FIG. 13, scenarios 262-264 may represent switching frequencies during three burst modes based on input voltages. In some examples, scenario 262 may correspond to an input voltage of three hundred and ninety volts, scenario 263 may correspond to an input voltage of two hundred and fifty volts, scenario 264 may correspond to an input voltage of one hundred and twenty volts. These input voltages are examples and may vary depending on the application. In some examples, the initial switching frequency for scenario 262 may be equal to the initial switching frequency for scenarios 263, 264.

The minimum burst switching frequency at time 268 for each of scenarios 262-264 may vary based on the input voltage. When the input voltage signal is relatively high, as in scenario 262, the minimum burst switching frequency may be higher than when the input voltage signal is relatively low, as in scenario 264. When controller device 4 determines that the input voltage is relatively high, as in scenario 262, the processing circuitry may determine a relatively high minimum burst switching frequency to cause a relatively low voltage gain. When controller device 4 determines that the input voltage is relatively low, as in scenario 264, the processing circuitry may scale down the minimum burst switching frequency to a relatively low minimum burst switching frequency to cause a relatively high voltage gain.

The processing circuitry may increase the switching frequency from the minimum burst switching frequency at time 268 to a final switching frequency at an ending of the burst mode at time 270. The processing circuitry may cause the switching frequency to increase by one or more steps to the final switching frequency. FIG. 13 depicts the final switching frequency as equal to the initial switching frequency, but in some examples, the initial switching frequency and the final switching frequency may be different. In some examples, scenarios 262-264 may have different initial switching frequencies and/or final switching frequencies.

The initial switching frequency at time 266 may be higher than a resonant frequency of resonant mode power converter circuit 2 to prepare LLC circuit 10 for the burst mode. The minimum burst switching frequency at time 268 may be lower than the resonant frequency to increase the voltage gain and increase the output voltage of load 14. The final switching frequency at time 270 may be higher than the resonant frequency to prepare LLC circuit 10 for the next power saving mode after time 270. Starting and ending a burst mode at switching frequencies above the resonant frequency may reduce start-up biasing current in resonant mode power converter circuit 2.

Figure 14:
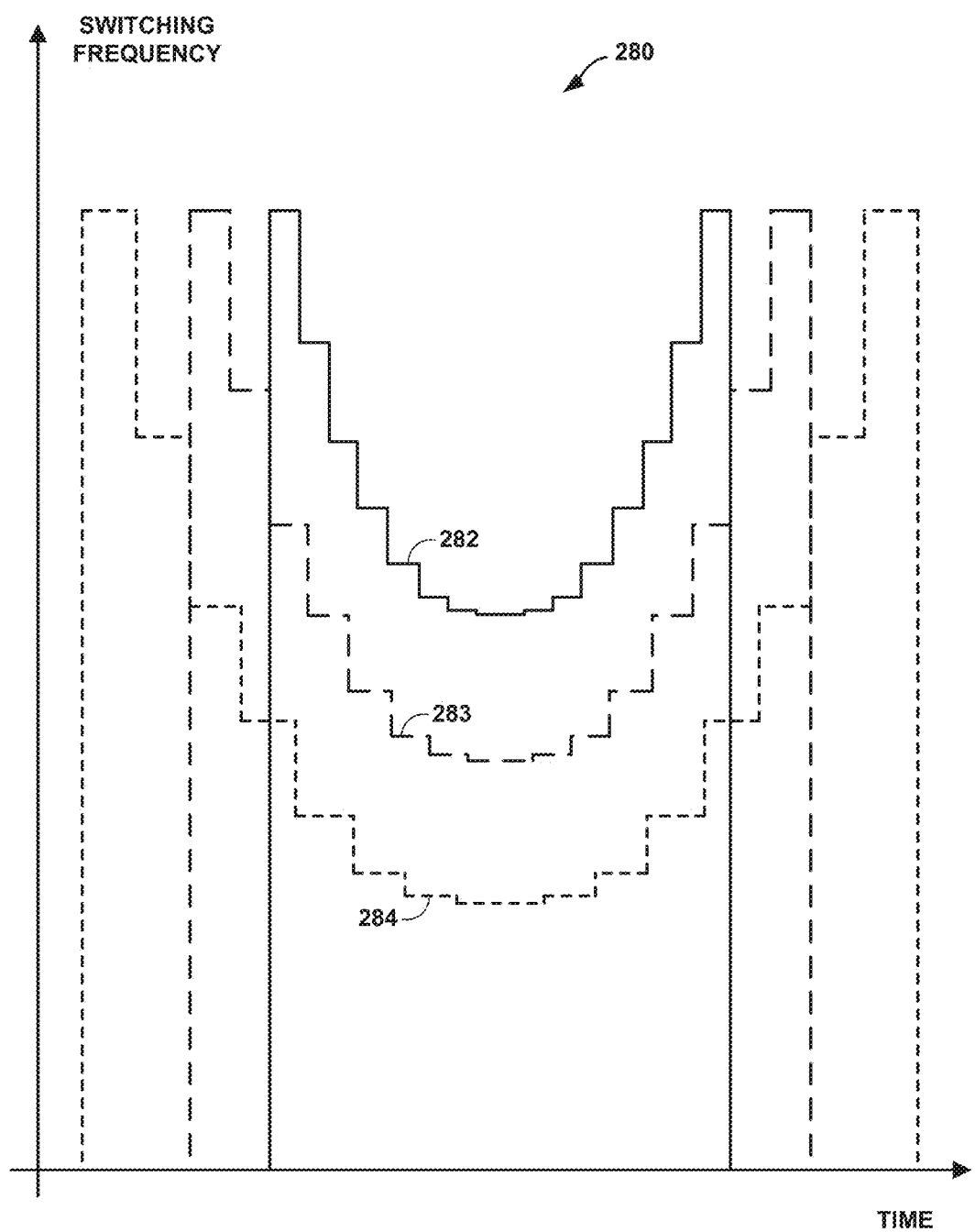
FIG. 14 is a graph of switching frequency over time based on an input voltage signal, in accordance with some examples of this disclosure.

FIG. 14 is a graph 280 of switching frequency over time based on an input voltage signal, in accordance with some examples of this disclosure. Feed-forward pin 24 may be configured to receive an input voltage signal during the power saving mode before the burst mode. The processing circuitry of controller device 4 may be configured to determine a duration of the burst mode based on the input voltage signal. For example, when the input voltage signal is relatively high, as in scenario 282, the duration of the burst mode may be relatively short and the minimum burst switching frequency may be relatively high. When the input voltage signal is relatively low, as in scenario 284, the duration of the burst mode may be relatively long and the minimum burst switching frequency may be relatively low.

In some examples, the processing circuitry may determine which of scenarios 262-264, 282-284 to implement based on thresholds for the input voltage signal. For example, if the input voltage signal is less than a first threshold voltage, the processing circuitry may determine a first duration and a first minimum burst switching frequency. If the input voltage signal is greater than or equal to the first threshold voltage and less than a second threshold voltage, the processing circuitry may determine a second duration and a second minimum burst switching frequency. If the input voltage signal is greater than or equal to the second first threshold voltage, the processing circuitry may determine a third duration and a third minimum burst switching frequency. In some examples, the processing circuitry may apply the relationship functions of graph 220 depicted in FIG. 10 to determine a switching frequency. In some examples, the processing circuitry may determine a switching period instead of a switching frequency and cause control pins 34, 36 to deliver control signals based on the switching period.

The techniques of this disclosure provide a burst mode that may allow for PFC 8 to remain completely in standby mode without any switching of PFC 8. In such examples, the DC signal from rectifier 6 may be sufficient to supply to LLC circuit 10 without being corrected by PFC 8, so that the processing circuitry may operate within a range of LLC switching frequencies to generate the desired output power. By disabling the switching in PFC 8, resonant mode power converter circuit 2 may achieve better efficiency than other resonant mode power converter circuits. In some examples, resonant mode power converter circuit 2 may reduce power losses from ten percent to eight percent by using feed-forward pin 24 to determine switching frequencies. A reduction in power losses may lead to a reduction in heat dissipation in resonant mode power converter circuit 2. In some examples, when the desired output power is higher or the input voltage signal is too low, PFC 8 may operate to correct the DC signal level for the processing circuitry to operate within its frequency range.

Figure 15:
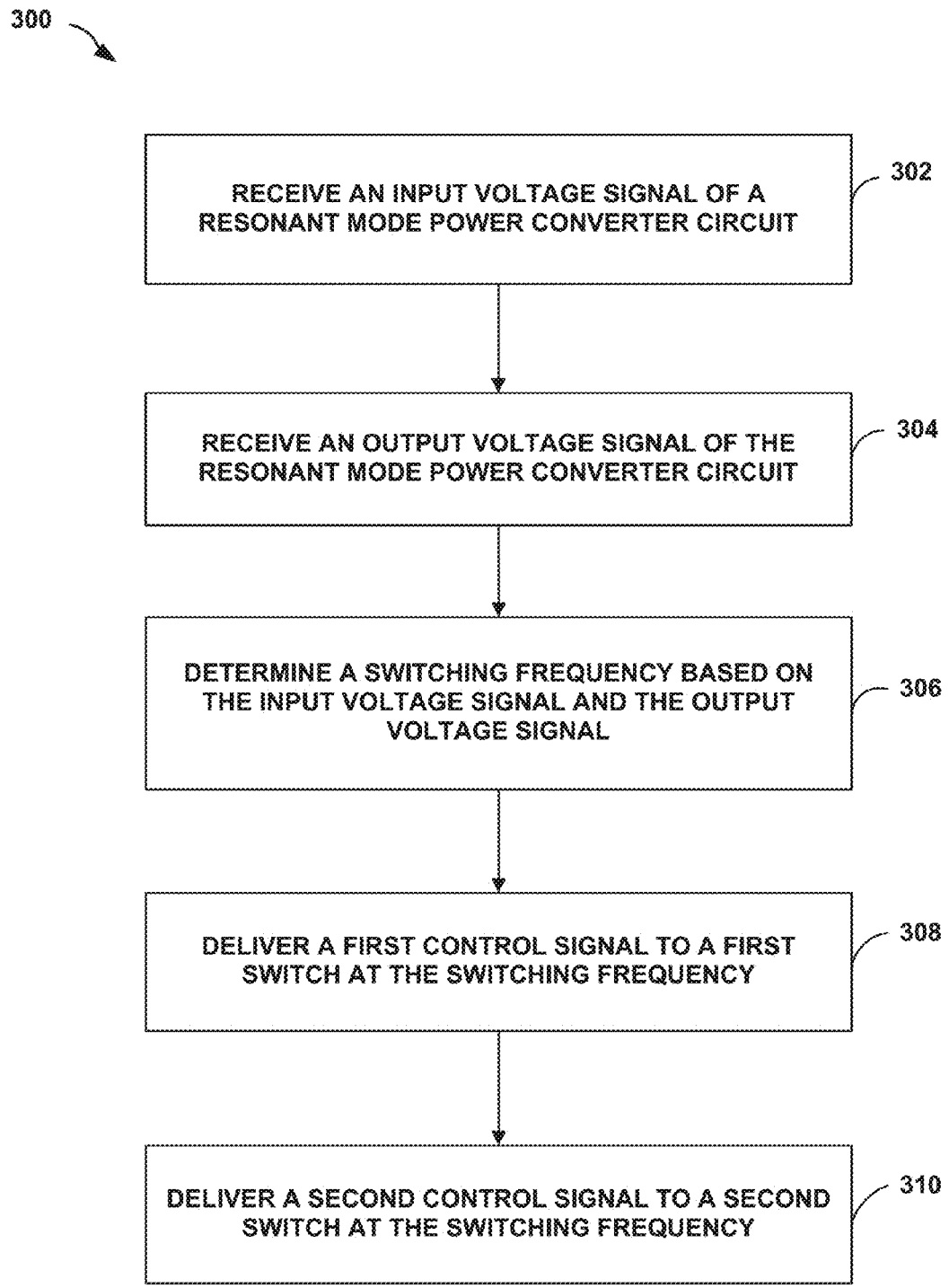
FIG. 15 is a flowchart illustrating a technique for controlling a switching frequency of a first switch and a second switch of a resonant mode power converter circuit, in accordance with some examples of this disclosure.

FIG. 15 is a flowchart illustrating a technique 300 for controlling a switching frequency of a first switch and a second switch of a resonant mode power converter circuit, in accordance with some examples of this disclosure. Technique 300 is described with reference to controller device 4 in FIG. 2, although other components, such as controller device 4 in FIGS. 1, 8, and 11, may exemplify similar techniques.

The technique of FIG. 15 includes receiving an input voltage signal of resonant mode power converter circuit 2 (302). Controller device 4 may receive the input voltage signal from feed-forward circuit 20 at feed-forward pin 24. Feed-forward circuit 20 may include a voltage divider circuit with resistors and/or capacitors to divide the input voltage into the input voltage signal with a voltage level that is manageable for feed-forward pin 24. Feed-forward pin 24 may be electrically connected to an ADC that is configured to convert the input voltage signal into a digital voltage signal for use by the processing circuitry.

The technique of FIG. 15 also includes receiving an output voltage signal of resonant mode power converter circuit 2 (304). Controller device 4 may receive the output voltage signal from output feedback circuit 16 at feedback pin 30. Output feedback circuit 16 may include isolation circuit 76 and a voltage divider circuit with resistors and/or capacitors to divide the output voltage into the output voltage signal with a voltage level that is manageable for feedback pin 30. Isolation circuit 76 may provide galvanic isolation between load 14 and controller device 4. Feedback pin 30 may be electrically connected to an ADC that is configured to convert the output voltage signal into a second digital voltage signal for use by the processing circuitry.

The technique of FIG. 15 also includes determining a switching frequency based on the input voltage signal and the output voltage signal (306). The processing circuitry may include a VCO that adjusts the frequency of oscillation based on the input voltage signal and the output voltage signal. The processing circuitry may use the oscillation frequency to determine the switching frequency.

The technique of FIG. 15 also includes delivering a first control signal to switch 62A at the switching frequency (308). Controller device 4 may deliver the first control signal to switch 62A through control pin 34. In some examples, the first control signal may include an enabling period causing switch 62A to conduct electricity from input node 64A to tank circuit 60. The first control signal may also include a non-enabling period with dead time between the enabling period of the first control signal and the enabling period of the second control signal so that neither of switches 62A, 62B conducts electricity during the dead time.

The technique of FIG. 15 also includes delivering a second control signal to switch 62B at the switching frequency (310). Controller device 4 may deliver the second control signal to switch 62B through control pin 36. In some examples, the second control signal may include an enabling period causing switch 62B to conduct electricity from tank circuit 60 to input node 64B.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of controller device 4 and the processing circuitry of controller device 4 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Controller device 4 and the processing circuitry of controller device 4 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of controller device 4 and/or the processing circuitry of controller device 4 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

Example 1

A controller device for a resonant mode power converter circuit, the controller device comprising a feed-forward pin configured to receive an input voltage signal of the resonant mode power converter circuit, a feedback pin configured to receive an output voltage signal of the resonant mode power converter circuit, processing circuitry configured to determine a switching frequency based on the input voltage signal and the output voltage signal, a first control pin configured to deliver a first control signal to the first switch at the switching frequency, and a second control pin configured to deliver a second control signal the second switch at the switching frequency.

Example 2

The controller device of example 1, wherein the feed-forward pin is configured to receive the input voltage signal by at least receiving a divided voltage signal from an intermediate node of a voltage divider circuit; and an end node of the voltage divider circuit is electrically connected to an input voltage node of the resonant mode power converter circuit.

Example 3

The controller device of examples 1-2 or any combination thereof, further comprising an analog-to-digital converter configured to receive the input voltage signal from the feed-forward pin and output a digital voltage signal to the processing circuitry, wherein the processing circuitry is configured to determine the switching frequency based at least in part on the digital voltage signal.

Example 4

The controller device of examples 1-3 or any combination thereof, wherein the processing circuitry is further configured to cause the first control pin to refrain from delivering control signals to the first switch during a power saving mode, cause the second control pin to refrain from delivering control signals to the second switch during the power saving mode, and determine the switching frequency for a burst mode based on the input voltage signal and the output voltage signal, wherein the burst mode occurs after the power saving mode.

Example 5

The controller device of examples 1-4 or any combination thereof, wherein the processing circuitry is configured to determine the switching frequency for the burst mode by at least determining a first switching frequency for the burst mode based on a first input voltage signal and determining a second switching frequency for the burst mode based on a second input voltage signal. When the first input voltage signal is greater than the second input voltage signal, the first switching frequency is greater than or equal to the second switching frequency, and when the second input voltage signal is greater than the first input voltage signal, the second switching frequency is greater than or equal to the first switching frequency.

Example 6

The controller device of examples 1-5 or any combination thereof, wherein the power saving mode occurs during an inactive period for a power factor correction circuit that is electrically connected to the resonant mode power converter circuit; the processing circuitry is configured to determine an initial switching frequency at a beginning of the burst mode, a minimum burst switching frequency during the burst mode, and a final switching frequency at an ending of the burst mode; each of the initial switching frequency and the final switching frequency is greater than a resonant frequency of the resonant mode power converter circuit; and the minimum burst switching frequency is less than the resonant frequency.

Example 7

The controller device of examples 1-6 or any combination thereof, wherein the feed-forward pin is configured to receive the input voltage signal during the power saving mode; the processing circuitry is configured to determine a duration of the burst mode based on the input voltage signal, cause the first control pin to deliver a third control signal to the first switch at the initial switching frequency at the beginning of the burst mode, cause the second control pin to deliver a fourth control signal to the second switch at the initial switching frequency at the beginning of the burst mode, reduce, during the burst mode, the switching frequency from the initial switching frequency to the minimum burst switching frequency, and increase the switching frequency from the minimum burst switching frequency to the final switching frequency at the ending of the burst mode.

Example 8

The controller device of examples 1-7 or any combination thereof, wherein the processing circuitry is configured to determine a duration of the burst mode based on the input voltage signal; cause the first control pin to refrain from delivering control signals to the first switch during a second power saving mode that occurs after the burst mode; and cause the second control pin to refrain from delivering control signals the second switch during the second power saving mode.

Example 9

The controller device of examples 1-8 or any combination thereof, wherein the processing circuitry is configured to determine a first duration of a first burst mode based on a first input voltage signal; the processing circuitry is configured to determine a second duration of a second burst mode based on a second input voltage signal; when the first input voltage signal is greater than the second input voltage signal, the first duration is shorter than or equal to the second duration; and when the second input voltage signal is greater than the first input voltage signal, the first duration is shorter than or equal to the second duration.

Example 10

The controller device of examples 1-9 or any combination thereof, wherein the processing circuitry is configured to determine the switching frequency based on a piecewise continuous function; a first input variable of the piecewise continuous function comprises the input voltage signal; a second input variable of the piecewise continuous function comprises the output voltage signal; and an output variable of the piecewise continuous function comprises the switching frequency.

Example 11

The controller device of examples 1-10 or any combination thereof, wherein the piecewise continuous function comprises a first function and a second function; the processing circuitry is configured to determine a first switching frequency based on the first function if the input voltage signal is less than a predetermined input voltage level; the processing circuitry is configured to determine a second switching frequency based on the second function if the input voltage signal is greater than the predetermined input voltage level; and the first switching frequency is less than the second switching frequency.

Example 12

A method for controlling a switching frequency of a first switch and a second switch of a resonant mode power converter circuit, the method comprising receiving an input voltage signal of the resonant mode power converter circuit, receiving an output voltage signal of the resonant mode power converter circuit, determining the switching frequency based on the input voltage signal and the output voltage signal, delivering a first control signal to the first switch at the switching frequency, and delivering a second control signal to the second switch at the switching frequency.

Example 13

The method of example 12, wherein receiving the input voltage signal comprises receiving a divided voltage signal from an intermediate node of a voltage divider circuit; and an end node of the voltage divider circuit is electrically connected to an input voltage node of the resonant mode power converter circuit.

Example 14

The method of examples 12-13 or any combination thereof, further comprising converting the input voltage signal to a digital voltage signal, wherein determining the switching frequency based on the input voltage signal comprises determining the switching frequency based on the digital voltage signal.

Example 15

The method of examples 12-14 or any combination thereof, further comprising: refraining from delivering control signals to the first switch during a power saving mode; refraining from delivering control signals to the second switch during the power saving mode; and determining the switching frequency for a burst mode based on the input voltage signal and the output voltage signal, wherein the burst mode occurs within the power saving mode.

Example 16

The method of examples 12-15 or any combination thereof, wherein determining the switching frequency for the burst mode comprises: determining a first switching frequency for a first input voltage signal; and determining a second switching frequency for a second input voltage signal, wherein when the first input voltage signal is greater than the second input voltage signal, the first switching frequency is greater than or equal to the second switching frequency, and when the second input voltage signal is greater than the first input voltage signal, the second switching frequency is greater than or equal to the first switching frequency.

Example 17

The method of examples 12-16 or any combination thereof, further comprising determining a first duration of a first burst mode based on a first input voltage signal: determining a second duration of a second burst mode based on a second input voltage signal, wherein the first input voltage signal is greater than the second input voltage signal, and wherein the first duration is shorter than the second duration, wherein when the first input voltage signal is greater than the second input voltage signal, the first duration is shorter than or equal to the second duration; and when the second input voltage signal is greater than the first input voltage signal, the first duration is shorter than or equal to the second duration.

Example 18

The method of examples 12-17 or any combination thereof, further comprising determining the switching frequency based on a piecewise continuous function, wherein a first input variable of the piecewise continuous function comprises the input voltage signal; a second input variable of the piecewise continuous function comprises the output voltage signal; and an output variable of the piecewise continuous function comprises the switching frequency.

Example 19

The method of examples 12-18 or any combination thereof, wherein the piecewise continuous function comprises a first function and a second function, the method further comprising determining a first switching frequency based on the first function if the input voltage signal is less than a predetermined input voltage level; and determining a second switching frequency based on the second function if the input voltage signal is greater than the predetermined input voltage level, wherein the first switching frequency is less than the second switching frequency.

Example 20

A controller device for a resonant mode power converter circuit, the controller device comprising a feed-forward pin configured to receive an input voltage signal of the resonant mode power converter circuit during a power saving mode; a feedback pin configured to receive an output voltage signal of the resonant mode power converter circuit; a first control pin configured to deliver control signals to a first switch; a second control pin configured to deliver control signals to a second switch. The controller device further comprises processing circuitry configured to cause the first control pin to refrain from delivering control signals to the first switch during the power saving mode, cause the second control pin to refrain from delivering control signals to the second switch during the power saving mode, and determine an initial switching frequency for a burst mode, wherein the burst mode occurs after the power saving mode, and wherein the initial switching frequency is greater than a resonant frequency of the resonant mode power converter circuit. The processing circuitry is further configured to determine a minimum burst switching frequency based on the input voltage signal, wherein the initial switching frequency is less than the resonant frequency, cause the first control pin to deliver a first control signal to the first switch at the initial switching frequency at a beginning of the burst mode, cause the second control pin to deliver a second control signal to the second switch at the initial switching frequency at the beginning of the burst mode, and reduce, during the burst mode, the switching frequency from the initial switching frequency to the minimum burst switching frequency.

Various examples of the disclosure have been described. Any combination of the described systems, operations, or functions is contemplated. These and other examples are within the scope of the following claims.

What is claimed is:

1. A controller device for a resonant mode power converter circuit comprising a first switch and a second switch, the controller device comprising:

a feed-forward pin configured to receive an input voltage signal of the resonant mode power converter circuit;
a feedback pin configured to receive an output voltage signal of the resonant mode power converter circuit;
processing circuitry configured to determine a switching frequency based on the input voltage signal and the output voltage signal;
a first control pin configured to deliver a first control signal to the first switch at the switching frequency; and
a second control pin configured to deliver a second control signal the second switch at the switching frequency, wherein the processing circuitry is further configured to:
 cause the first control pin to refrain from delivering control signals to the first switch during a power saving mode;
 cause the second control pin to refrain from delivering control signals to the second switch during the power saving mode; and
 determine the switching frequency for a burst mode based on the input voltage signal and the output voltage signal, wherein the burst mode occurs after the power saving mode.

2. The controller device of claim 1, wherein:
the feed-forward pin is configured to receive the input voltage signal by at least receiving a divided voltage signal from an intermediate node of a voltage divider circuit; and
an end node of the voltage divider circuit is electrically connected to an input voltage node of the resonant mode power converter circuit.

3. The controller device of claim 1, further comprising an analog-to-digital converter configured to:
receive the input voltage signal from the feed-forward pin; and
output a digital voltage signal to the processing circuitry, wherein the processing circuitry is configured to determine the switching frequency based at least in part on the digital voltage signal.

4. The controller device of claim 1, wherein the processing circuitry is configured to determine the switching frequency for the burst mode by at least:
determining a first switching frequency for the burst mode based on a first input voltage signal; and
determining a second switching frequency for the burst mode based on a second input voltage signal, wherein:
 when the first input voltage signal is greater than the second input voltage signal, the first switching frequency is greater than or equal to the second switching frequency, and
 when the second input voltage signal is greater than the first input voltage signal, the second switching frequency is greater than or equal to the first switching frequency.

5. The controller device of claim 1, wherein:
the power saving mode occurs during an inactive period for a power factor correction circuit that is electrically connected to the resonant mode power converter circuit;
the processing circuitry is configured to determine an initial switching frequency at a beginning of the burst mode, a minimum burst switching frequency during the burst mode, and a final switching frequency at an ending of the burst mode;

each of the initial switching frequency and the final switching frequency is greater than a resonant frequency of the resonant mode power converter circuit; and the minimum burst switching frequency is less than the resonant frequency.

6. The controller device of claim 5, wherein:

the feed-forward pin is configured to receive the input voltage signal during the power saving mode;

the processing circuitry is configured to:

determine a duration of the burst mode based on the input voltage signal, cause the first control pin to deliver a third control signal to the first switch at the initial switching frequency at the beginning of the burst mode, cause the second control pin to deliver a fourth control signal to the second switch at the initial switching frequency at the beginning of the burst mode, reduce, during the burst mode, the switching frequency from the initial switching frequency to the minimum burst switching frequency, and increase the switching frequency from the minimum burst switching frequency to the final switching frequency at the ending of the burst mode.

7. The controller device of claim 1, wherein the processing circuitry is configured to:

determine a duration of the burst mode based on the input voltage signal;

cause the first control pin to refrain from delivering control signals to the first switch during a second power saving mode that occurs after the burst mode; and cause the second control pin to refrain from delivering control signals the second switch during the second power saving mode.

8. The controller device of claim 7, wherein:

the processing circuitry is configured to determine a first duration of a first burst mode based on a first input voltage signal;

the processing circuitry is configured to determine a second duration of a second burst mode based on a second input voltage signal;

when the first input voltage signal is greater than the second input voltage signal, the first duration is shorter than or equal to the second duration; and when the second input voltage signal is greater than the first input voltage signal, the first duration is shorter than or equal to the second duration.

9. The controller device of claim 1, wherein:

the processing circuitry is configured to determine the switching frequency based on a piecewise continuous function;

a first input variable of the piecewise continuous function comprises the input voltage signal;

a second input variable of the piecewise continuous function comprises the output voltage signal; and an output variable of the piecewise continuous function comprises the switching frequency.

10. The controller device of claim 9, wherein:

the piecewise continuous function comprises a first function and a second function;

the processing circuitry is configured to determine a first switching frequency based on the first function if the input voltage signal is less than a predetermined input voltage level;

the processing circuitry is configured to determine a second switching frequency based on the second function if the input voltage signal is greater than the predetermined input voltage level; and the first switching frequency is less than the second switching frequency.

11. A method for controlling a switching frequency of a first switch and a second switch of a resonant mode power converter circuit, the method comprising:

receiving an input voltage signal of the resonant mode power converter circuit;

receiving an output voltage signal of the resonant mode power converter circuit;

determining the switching frequency based on the input voltage signal and the output voltage signal;

delivering a first control signal to the first switch at the switching frequency;

delivering a second control signal to the second switch at the switching frequency;

refraining from delivering control signals to the first switch during a power saving mode;

refraining from delivering control signals to the second switch during the power saving mode; and determining the switching frequency for a burst mode based on the input voltage signal and the output voltage signal, wherein the burst mode occurs after the power saving mode.

12. The method of claim 11, wherein:

receiving the input voltage signal comprises receiving a divided voltage signal from an intermediate node of a voltage divider circuit; and an end node of the voltage divider circuit is electrically connected to an input voltage node of the resonant mode power converter circuit.

13. The method of claim 11, further comprising converting the input voltage signal to a digital voltage signal, wherein determining the switching frequency based on the input voltage signal comprises determining the switching frequency based on the digital voltage signal.

14. The method of claim 11, wherein determining the switching frequency for the burst mode comprises:

determining a first switching frequency for a first input voltage signal; and determining a second switching frequency for a second input voltage signal, wherein:

when the first input voltage signal is greater than the second input voltage signal, the first switching frequency is greater than or equal to the second switching frequency, and when the second input voltage signal is greater than the first input voltage signal, the second switching frequency is greater than or equal to the first switching frequency.

15. The method of claim 11, further comprising:

determining a first duration of a first burst mode based on a first input voltage signal;

determining a second duration of a second burst mode based on a second input voltage signal, wherein the first input voltage signal is greater than the second input voltage signal, and wherein the first duration is shorter than the second duration, wherein:

when the first input voltage signal is greater than the second input voltage signal, the first duration is shorter than or equal to the second duration; and when the second input voltage signal is greater than the first input voltage signal, the first duration is shorter than or equal to the second duration.

16. The method of claim 11, further comprising determining the switching frequency based on a piecewise continuous function, wherein:
- a first input variable of the piecewise continuous function comprises the input voltage signal;
- a second input variable of the piecewise continuous function comprises the output voltage signal; and
- an output variable of the piecewise continuous function comprises the switching frequency.

17. The method of claim 16, wherein the piecewise continuous function comprises a first function and a second function, the method further comprising:
- determining a first switching frequency based on the first function if the input voltage signal is less than a predetermined input voltage level; and
- determining a second switching frequency based on the second function if the input voltage signal is greater than the predetermined input voltage level, wherein the first switching frequency is less than the second switching frequency.

18. A controller device for a resonant mode power converter circuit, the controller device comprising:
- a feed-forward pin configured to receive an input voltage signal of the resonant mode power converter circuit during a power saving mode;
- a feedback pin configured to receive an output voltage signal of the resonant mode power converter circuit;
- a first control pin configured to deliver control signals to a first switch;
- a second control pin configured to deliver control signals to a second switch; and
- processing circuitry configured to:
    - cause the first control pin to refrain from delivering control signals to the first switch during the power saving mode,
    - cause the second control pin to refrain from delivering control signals to the second switch during the power saving mode,
    - determine an initial switching frequency for a burst mode, wherein the burst mode occurs after the power saving mode, and wherein the initial switching frequency is greater than a resonant frequency of the resonant mode power converter circuit,
    - determine a minimum burst switching frequency based on the input voltage signal, wherein the initial switching frequency is less than the resonant frequency,
    - cause the first control pin to deliver a first control signal to the first switch at the initial switching frequency at a beginning of the burst mode,
    - cause the second control pin to deliver a second control signal to the second switch at the initial switching frequency at the beginning of the burst mode, and
    - reduce, during the burst mode, the switching frequency from the initial switching frequency to the minimum burst switching frequency.

19. The controller device of claim 18, wherein:
the processing circuitry is configured to determine the switching frequency based on a piecewise continuous function;
a first input variable of the piecewise continuous function comprises the input voltage signal;
a second input variable of the piecewise continuous function comprises the output voltage signal; and
an output variable of the piecewise continuous function comprises the switching frequency.

20. The controller device of claim 19, wherein:
the piecewise continuous function comprises a first function and a second function;
the processing circuitry is configured to determine a first switching frequency based on the first function if the input voltage signal is less than a predetermined input voltage level;
the processing circuitry is configured to determine a second switching frequency based on the second function if the input voltage signal is greater than the predetermined input voltage level; and
the first switching frequency is less than the second switching frequency.

* * * * *